(12) United States Patent
Hayama et al.

(10) Patent No.: US 6,421,032 B2
(45) Date of Patent: *Jul. 16, 2002

(54) METHOD OF CREATING EXTERNAL CHARACTERS IN IMAGE FORMING APPARATUS

(75) Inventors: Hitoshi Hayama, Suwa; Kenji Watanabe, Tokyo; Takanobu Kameda, Tokyo; Tomoyuki Shimmura, Tokyo, all of (JP)

(73) Assignees: Seiko Epson Corporation; King Jim Co., Ltd., both of Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/774,850

(22) Filed: Dec. 27, 1996

(30) Foreign Application Priority Data

Dec. 28, 1995 (JP) .............................................. 6-341999
Oct. 14, 1996 (JP) .............................................. 7-291142

(51) Int. Cl.$^7$ ................................................ G09G 1/14

(52) U.S. Cl. .......................... 345/26; 345/467; 345/468

(58) Field of Search ................................ 345/145, 123, 345/124, 116, 141, 142, 143, 144, 26, 467, 468

(56) References Cited

U.S. PATENT DOCUMENTS

| | | |
|---|---|---|
| 5,222,818 A | 6/1993 | Akiyama et al. |
| 5,230,572 A | 7/1993 | Hirono et al. |
| 5,403,101 A | 4/1995 | Nagase et al. |
| 5,464,290 A | 11/1995 | Watanabe et al. |
| 5,774,108 A * | 6/1998 | Michiyoshi ................. 345/123 |

FOREIGN PATENT DOCUMENTS

| | | |
|---|---|---|
| JP | 59228291 | 12/1984 |
| JP | 59228292 | 12/1984 |
| JP | 60238890 | 11/1985 |
| JP | 62245117 | 10/1987 |
| JP | 6334586 | 2/1988 |
| JP | 1128843 | 5/1989 |
| JP | 1263696 | 10/1989 |
| JP | 1314178 | 12/1989 |
| JP | 2307768 | 12/1990 |
| JP | 3103897 | 4/1991 |
| JP | 4294172 | 10/1992 |
| JP | 6115167 | 4/1994 |
| JP | 6118934 | 4/1994 |
| JP | 2522120 | 5/1996 |

OTHER PUBLICATIONS

Mastering WordPerfect 5.1 & 5.2 for Windows by Alan Simpson, 1993.*

* cited by examiner

Primary Examiner—Richard Hjerpe
Assistant Examiner—Ronald Laneau
(74) Attorney, Agent, or Firm—Hogan & Hartson, L.L.P.

(57) ABSTRACT

An external character creating method is provided for an image forming apparatus having a display screen. The external character creating method includes the steps of displaying at least a portion of image data in a specifying area on the display screen, displaying a dot-shaped cursor on the display screen, and creating an external character on the displayed image data using the cursor. The cursor is fixed at a position in the specifying area, so that the image data is scrolled in the vertical direction and in the horizontal direction to create an external character.

14 Claims, 28 Drawing Sheets

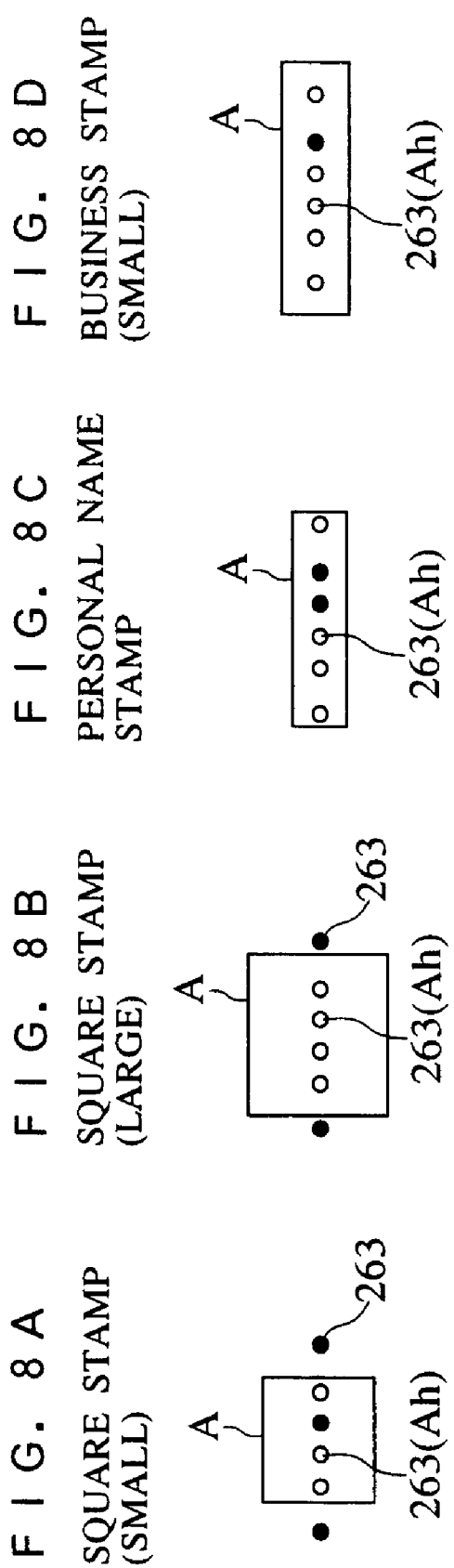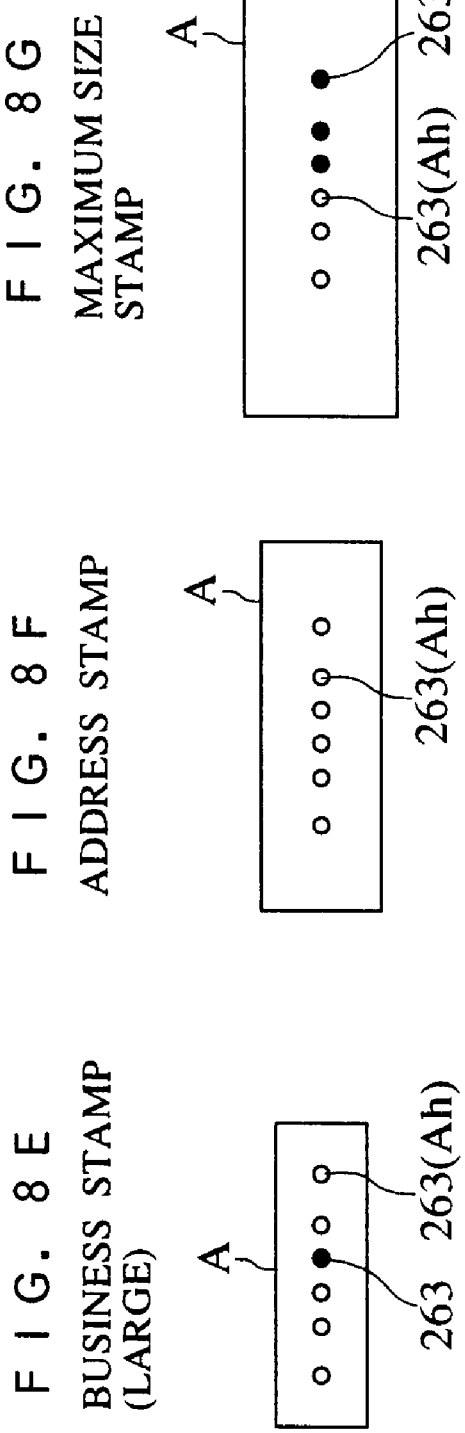

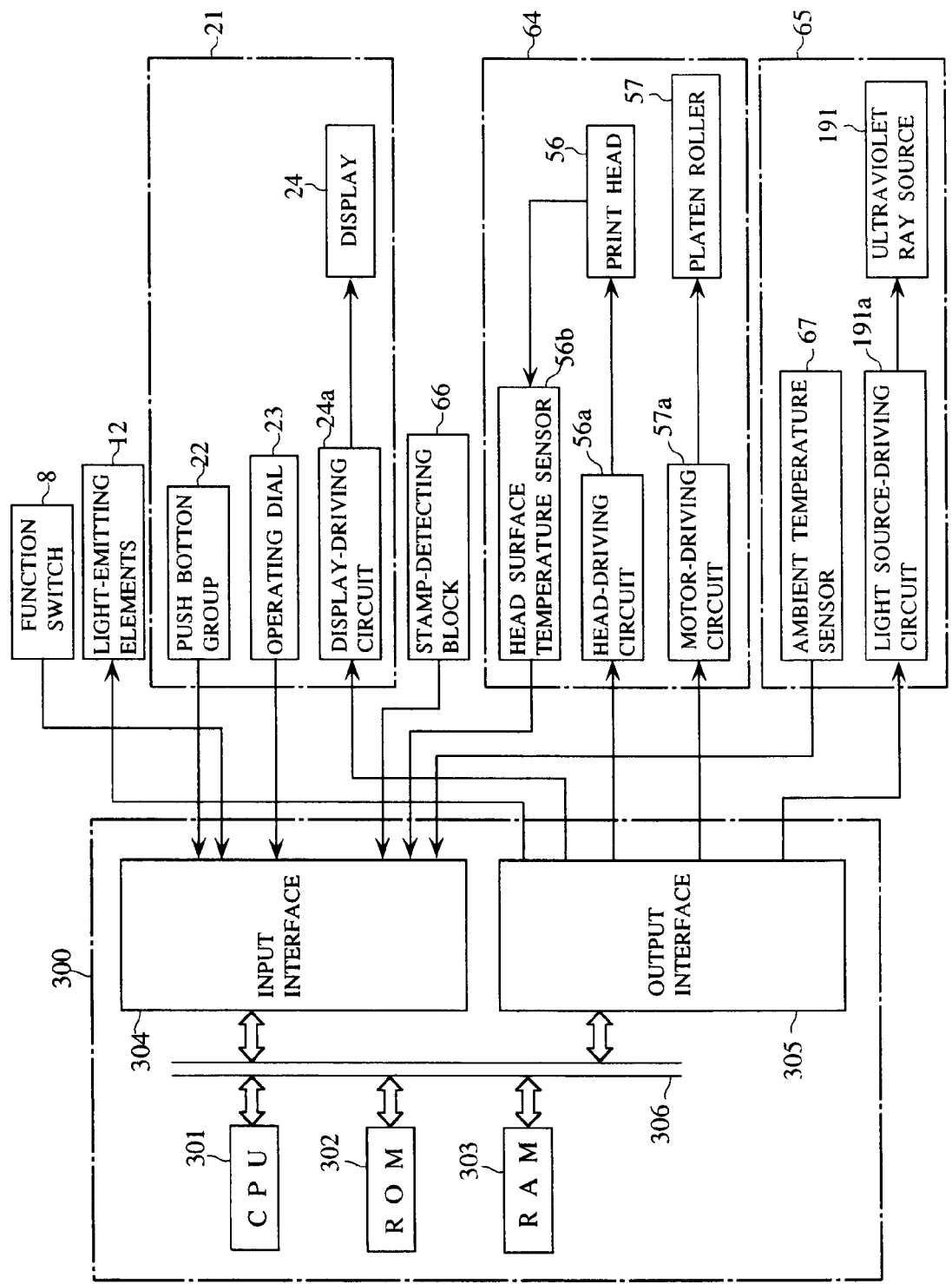

F I G. 1 2
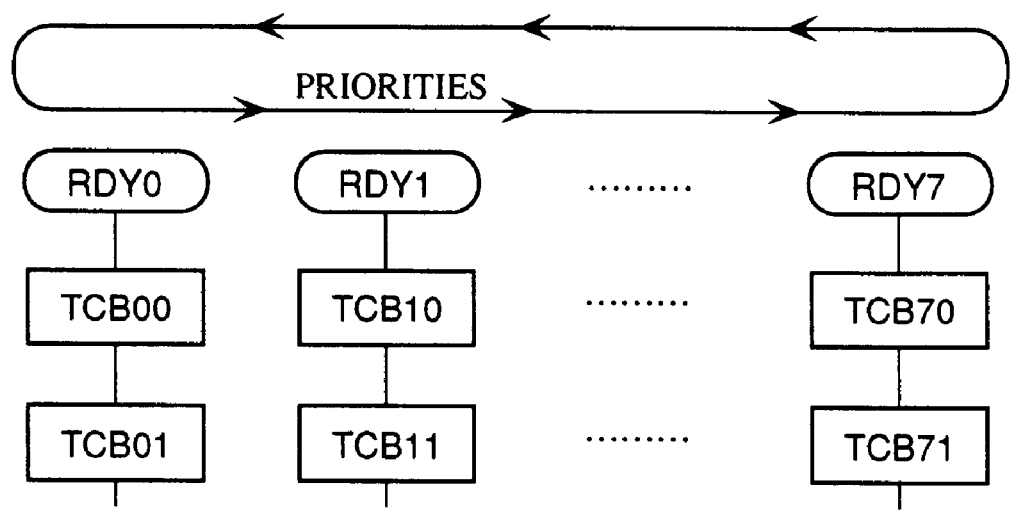
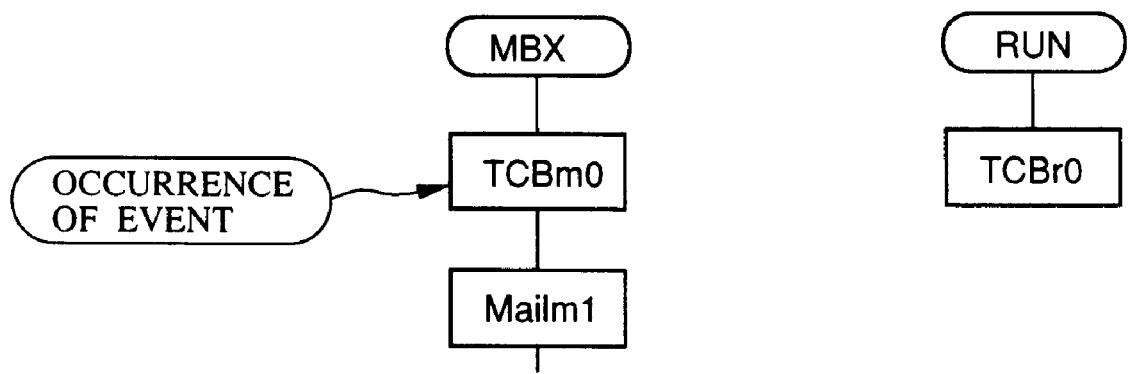

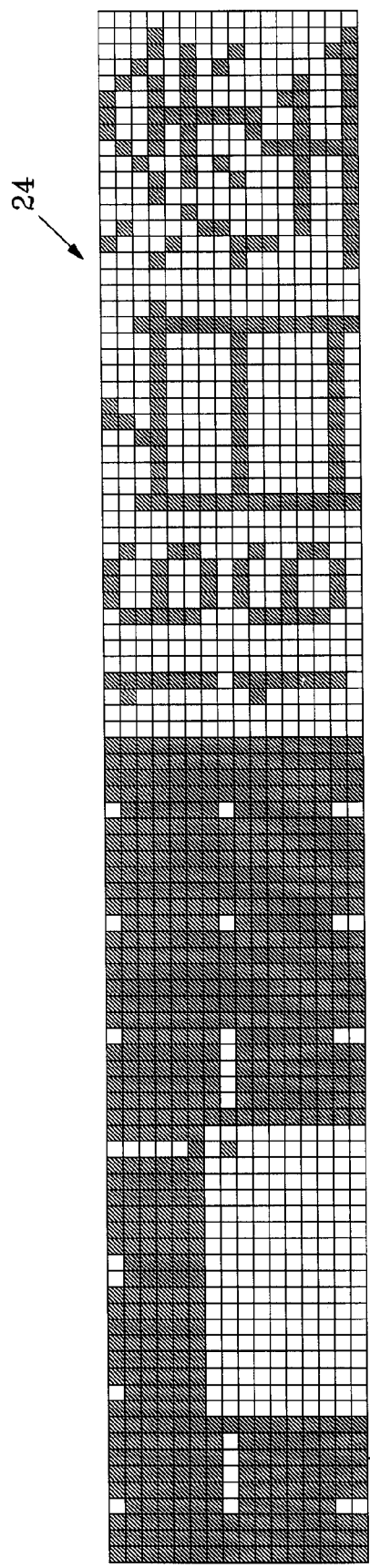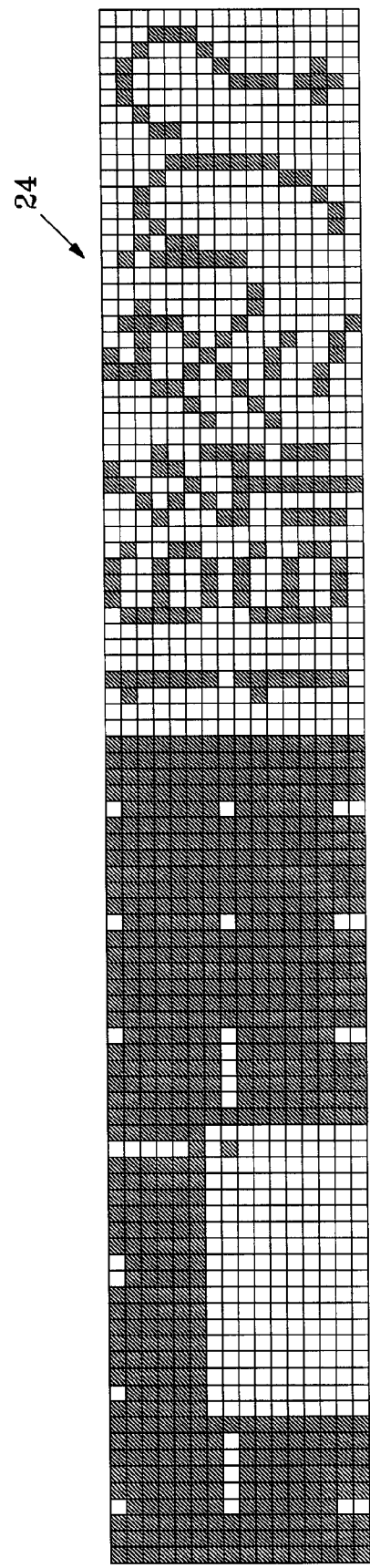

METHOD OF CREATING EXTERNAL CHARACTERS IN IMAGE FORMING APPARATUS

BACKGROUND OF THE INVENTION

1. Field of the Invention

The present invention relates generally to a method of creating external characters in an image forming apparatus, and more particularly to a method of creating an external character in a small specifying area on the screen of a display in an image forming apparatus.

2. Description of the Related Art

In a personal computer or a word processor, if a required character pattern is not previously stored in a memory, it is often the case that the user may additionally create the character pattern, i.e., external character by himself for his own use. A conventional method of creating an external character begins with calling a function of creating an external character from an associated apparatus, i.e., a personal computer or a word processor. When the function is called, a specifying area for creating an external character is displayed on the screen of a display. Then, the user moves a dot-like cursor in the vertical and horizontal directions in the specifying area to create a desired external character. The created external character is registered in a memory for later use such that it can be repetitively read therefrom as required.

However, when the conventional method of creating an external character is employed in a small image forming apparatus having a small display or in a multi-window environment having a number of small display windows on a display, a smaller specifying area is displayed corresponding to the size of the screen or window, causing difficulties in recognizing the position of the cursor for specifying dots. More specifically, even if the external character specifying area is small, an appropriate number of dots is required for displaying a variety of images or characters, so that the size of the dot itself must be reduced correspondingly. This requires the size of the cursor to be also reduced, however, since the cursor is extremely small, the user has difficulties in precisely recognizing the position of the cursor, when he is moving it, and is likely to lose the cursor in the specifying area. Thus, the conventional method of creating an external character has a problem that the creation of an external character burdens the user with very complicated and difficult works.

SUMMARY OF THE INVENTION

It is therefore an object of the present invention to provide a method of creating an external character in an image forming apparatus which is capable of readily and efficiently creating fine external characters even in a small external character specifying area on a display of the image forming apparatus.

To achieve the above object, according to the present invention, there is provided a method of creating an external character for an image forming apparatus having a display screen, the method comprising the steps of displaying at least a portion of image data in a specifying area on the display screen, displaying a dot-shaped cursor on the display screen, and creating an external character on the displayed image data using the cursor.

The external character creating method is characterized by scrolling the image data in the vertical direction and in the horizontal direction to create an external character with the cursor being fixed at a position in the specifying area.

According to the external character creating method of the present invention, since displayed image data is scrolled in the vertical and/or horizontal directions to create an external character without moving the position of the cursor in the specifying area on the display screen, the external character can be created without missing the cursor, which always remains at a fixed position, in a readily visible situation, even when a small specifying area only can be provided on the display screen for creating an external character and hence an extremely small cursor must be used in the small specifying area.

Preferably, the image forming apparatus provides a position indicating guide comprising a plurality of lines which intersect at the position of the cursor when the image data is displayed on the display screen.

In this preferred embodiment, since the intersection of the lines (cross) constituting the position indicating guide (for example, in a cross shape) indicates the position of the cursor, the position of the cursor can be readily recognized even if surrounding image data prevents the cursor from being clearly recognized in some situations.

Preferably, the position indicating guide is displayed within the display screen. That is to say, since the cursor always remains at the same position, the position indicating guide may be displayed within the specifying area on the display screen together with the cursor, image data, and so on.

Alternatively, the position indicating guide may be a mark formed on the image forming apparatus outside the display screen. Specifically, the position indicating guide may be added to the specifying area by engraving, for example, thin lines therein so as to facilitate viewing of a display on the screen.

Further preferably, the external character creating method has a plurality of drawing modes for executing a plurality of drawing methods using the cursor.

According to this preferred embodiment, an external character can be created in a mode which can be arbitrarily selected from a plurality of drawing modes including, for example, a drawing mode for setting or modifying dot information of individually specified dots, a drawing mode for collectively setting or modifying dot information of dots in an arbitrarily specified area, and so on, in accordance with features of a particular external character to be created, so that external character creation works are facilitated.

For example, the plurality of drawing modes include a dot reverse drawing mode for reversing dot information of a dot in the image data corresponding to the position of the cursor.

In this preferred embodiment, since arbitrary dots can be specified one by one in image data to reverse dot information thereof during the drawing in the dot reverse drawing mode, an external character can be readily created.

The plurality of drawing methods further include a range specifying drawing mode for specifying two dots on the image data with the cursor to set the same dot information to a group of dots within a rectangular area defined by a line connecting the two dots as a diagonal.

According to this preferred embodiment, the external character creating method can specify two dots on image data in the area specifying drawing mode to specify an arbitrary rectangular range in which dot information should be set. Thus, the utilization of the range specifying drawing mode permits an external character to be more readily created when an arbitrary area is specified to collectively set the same dot information in the specified area. It should be noted that when dot information is set to a single dot, the dot may be specified twice, i.e., as the two dots, thus making it possible to utilize the range specifying drawing mode as a drawing mode for specifying a dot. In addition, by specifying two dots which differ only in vertical or horizontal coordinate, the range specifying drawing mode may be utilized as a drawing mode for collectively specifying the same dot information to a group of dots on a vertical line or on a horizontal line.

Further preferably, the external character creating method has a plurality of external character management modes, one of which is arbitrarily selected to manage the image data, where the plurality of external character management modes include an external character registration mode for creating the external character on the image data and registering the created external character.

According to this preferred embodiment, one of the plurality of external character management modes including the external character registration mode may be arbitrarily selected as required to manage image data. For example, when an external character management mode for modifying an external character associated with registered image data, an external character management mode for copying, and so on are provided as other external character management modes, registered external characters may be utilized for other purposes, thereby providing efficient works for creating external characters.

Further preferably, the external character management modes further include at least one of an external character modification mode for modifying an external character associated with a registered image data to register the modified external character in place of the original one, an external character call mode for calling registered image data to generate corresponding text data, an external character copy mode for copying registered image data to separately register the copied image data as different image data, and external character deletion mode for deleting registered image data.

According to this preferred embodiment, since the external character management modes except for the external character registration mode include at least one of the external character modification mode, the external character call mode, the external character copy mode, and the external character deletion mode, the external character creating method has advantages such as increased ease and efficiency with which an external character can be created. For example, when the external character modification mode is included, the external character modification mode may be selected to modify a registered external character for utilizing the modified version as a different external character. Also, when the external character call mode is included, if an arbitrary symbol, figure, or the like has been created and registered as an external character, text data corresponding to the image data or the external character can be generated, so that a variety of text data can be provided. Further, when the external character copy mode is included, registered image data may be copied so as to utilize the copied image data in other processing of the image forming apparatus. In this way, the original image data can be preserved as it is even when the image data is subjected to a modification or any other processing. In addition, when the external character copy mode is utilized together with the external character modification mode, original image data as well as copied image data or the like may be simultaneously registered, thereby increasing the versatility of external characters. Furthermore, when the external character deletion mode is included, unnecessary image data may be deleted from registered image data, so that a storing region for registering external characters, typically reserved in a memory or the like, can be saved.

The above and other objects, features, and advantages of the present invention will become more apparent from the following detailed description of the preferred embodiment taken in conjunction with the accompanying drawings.

BRIEF DESCRIPTION OF THE DRAWINGS

FIG. 8A is a diagram illustrating a pattern for discriminating a stamp body of a smaller square stamp;

FIG. 8B is a diagram illustrating a pattern for discriminating a stamp body of a larger square stamp;

FIG. 8C is a diagram illustrating a pattern for discriminating a stamp body of a personal name stamp;

FIG. 8D is a diagram illustrating a pattern for discriminating a stamp body of a smaller business stamp;

FIG. 8E is a diagram illustrating a pattern for discriminating a stamp body of a larger business stamp;

FIG. 8F is a diagram illustrating a pattern for discriminating a stamp body of an address stamp;

FIG. 8G is a diagram illustrating a pattern for discriminating a maximum size stamp body;

FIG. 11 is a block diagram of a control block and devices connected thereto of the stamp-making apparatus;

FIG. 12 is a conceptual representation of an outline of multitasking executed in the stamp-making apparatus;

FIGS. 24A to 24D are explanatory diagrams for illustrating images displayed on the screen in respective drawing modes.

DESCRIPTION OF THE PREFERRED EMBODIMENTS

Referring now to the accompanying drawings, a method of creating an external character in an image forming apparatus according to an embodiment of the present invention will hereinafter be described in connection with a stamp-making apparatus in which the present invention is implemented.

Figure 1A:
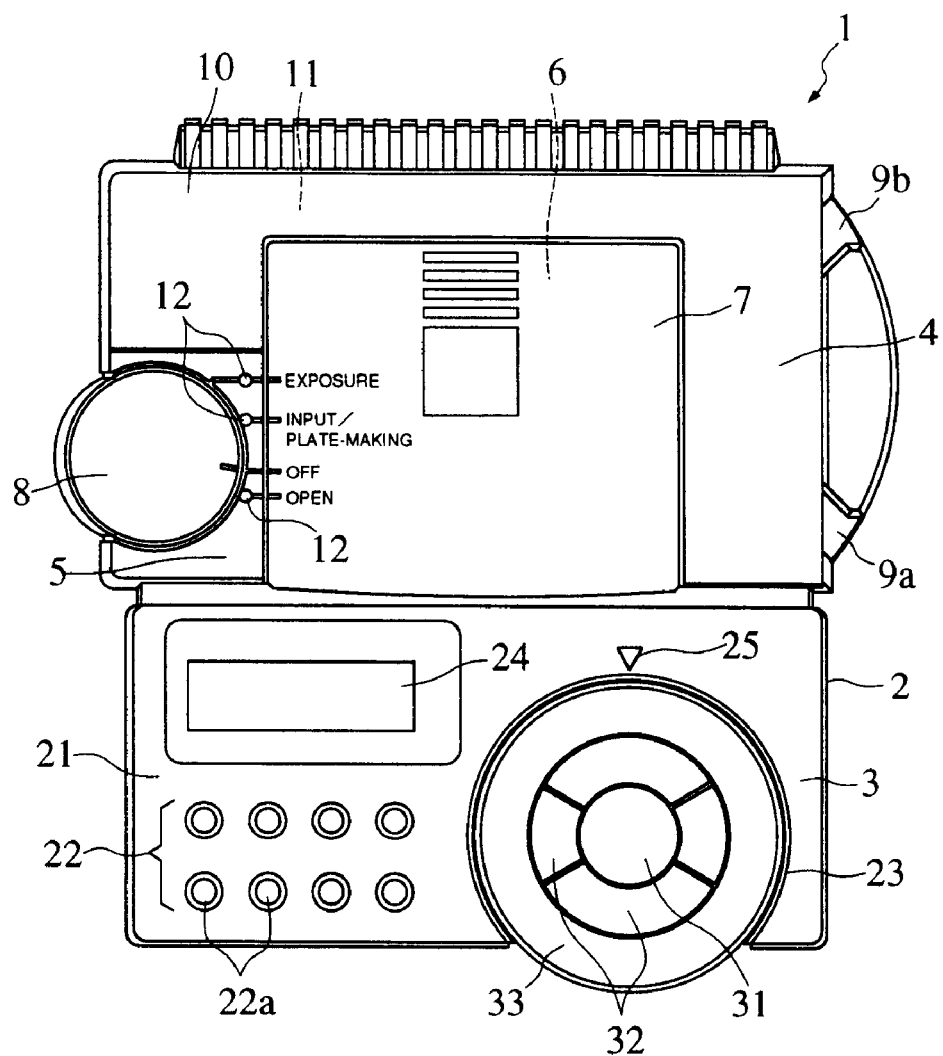
FIG. 1A is a plan view illustrating an appearance of a stamp-making apparatus to which is applied an external character creating method according to an embodiment of the invention.
Figure 1B:
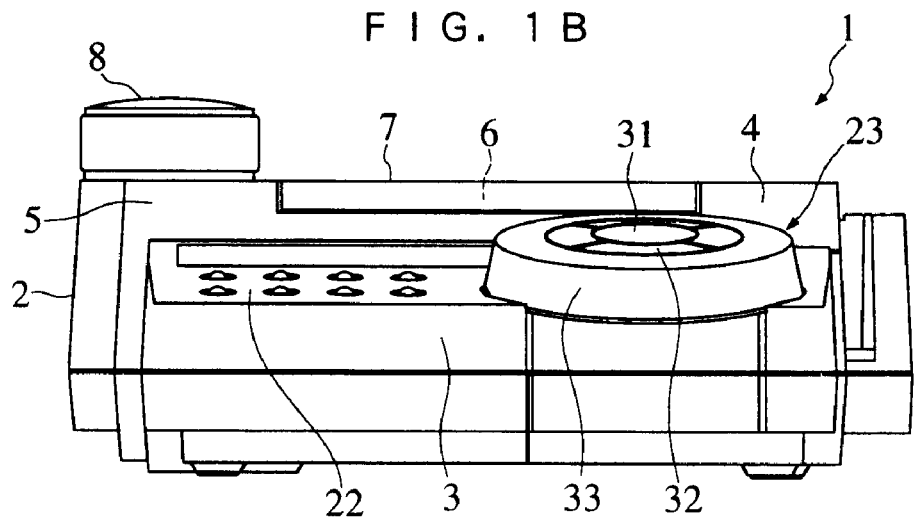
FIG. 1B is a front view illustrating an appearance of the stamp-making apparatus.

FIGS. 1A and 1B illustrate a stamp-making apparatus 1 to which is applied the external character creating method according the embodiment of the invention. The stamp-making apparatus makes a desired stamp by exposing a stamp body having a stamp surface formed of an ultraviolet curing resin to ultraviolet rays via a mask made of an ink ribbon on which stamp characters (images to be stamped including a pictorial pattern) are printed. The method of creating an external character in an image forming apparatus refers to a method of creating an image such as a character, a figure, and so on which have not been stored in a memory of the image forming apparatus. FIGS. 1A and 1B illustrate the stamp-making apparatus in a plan view and in a front view, respectively. FIG. 11 is a block diagram illustrating a control system of the apparatus.

As illustrated in FIGS. 1A and 1B, the stamp-making apparatus 1 includes a casing 2 having upper and lower divisional portions, an electronic block 3 arranged in a front part of the casing 2, and a mechanical block 4 arranged in a rear part of the same. The mechanical block 4 is comprised of a mechanical block body 5, a pocket 6 formed in a central area of the mechanical block for receiving therein a stamp body A as a stamp-making object material to mount the stamp body A in the mechanical block body 5, and a lid 7 for opening and closing the pocket 6, which is formed with a window. In a left side portion of the mechanical block 4 as viewed in the figures, a function switch 8 is provided for switching the operation of the stamp-making apparatus 1 between plate-making (printing) and exposure, as well as for permitting the lid 7 to be opened. Information of each switching operation of the function switch 9 is sent to an input interface 304 of a control block 300, later described, while indications of "EXPOSURE", "INPUT/PLATE-MAKING", "OFF" and "OPEN" are provided at respective operating positions. At the operating positions of "EXPOSURE", "INPUT/PLATE-MAKING", and "OPEN", there are provided respective light-emitting elements 12 connected to an output interface 305 of the control block 300. Further in a right side portion of the mechanical block 4, there are formed an inserting slot 9a for feeding a plate-making sheet B from which is made a stamp character label, later described, and a take-out slot 9b for delivering the plate-making sheet B therefrom. Further, the mechanical block 4 has a maintenance cover 10 removably mounted on part thereof outside the pocket 6, and an ink ribbon cartridge 11 carrying an ink ribbon C is mounted under the maintenance cover 10.

The electronic block 3 has an operating block 21 formed on the top thereof and contains the control block 300 therein. The operating block 21 includes a push button group 22 and an operating dial 23 both connected to the input interface 304 of the control block 300, and an indicator-driving circuit (see FIG. 11) connected to the output interface 305 of the control block 300 and an indicator 24 driven by the indicator-driving circuit 24a. The operating dial 23 has a triad structure including an execution key 31 having a circular shape and arranged in the center, a cursor/conversion key 32 having four divisional blocks arranged along the outer periphery of the execution key 31 to form an annular shape, and a character input key 33 having an annular shape and arranged along the outer periphery of the cursor/conversion key 32. On the surface of the character input key 33, hirakana characters representative of the Japanese syllabary, not shown, etc. are printed. Stamp characters are input by first determining a character size by pushing a predetermined button 22a of the push button group 22, turning the character input key 33 to set each of desired hirakana characters to a triangle mark 25, and pushing the execution key 31 whenever each of the desired hirakana characters is set to the triangle mark 25, followed by converting desired ones of the input hirakana characters to kanji characters by operating the cursor/conversion key 32. When desired stamp characters are formed on the display 24, they are settled.

Figure 2:
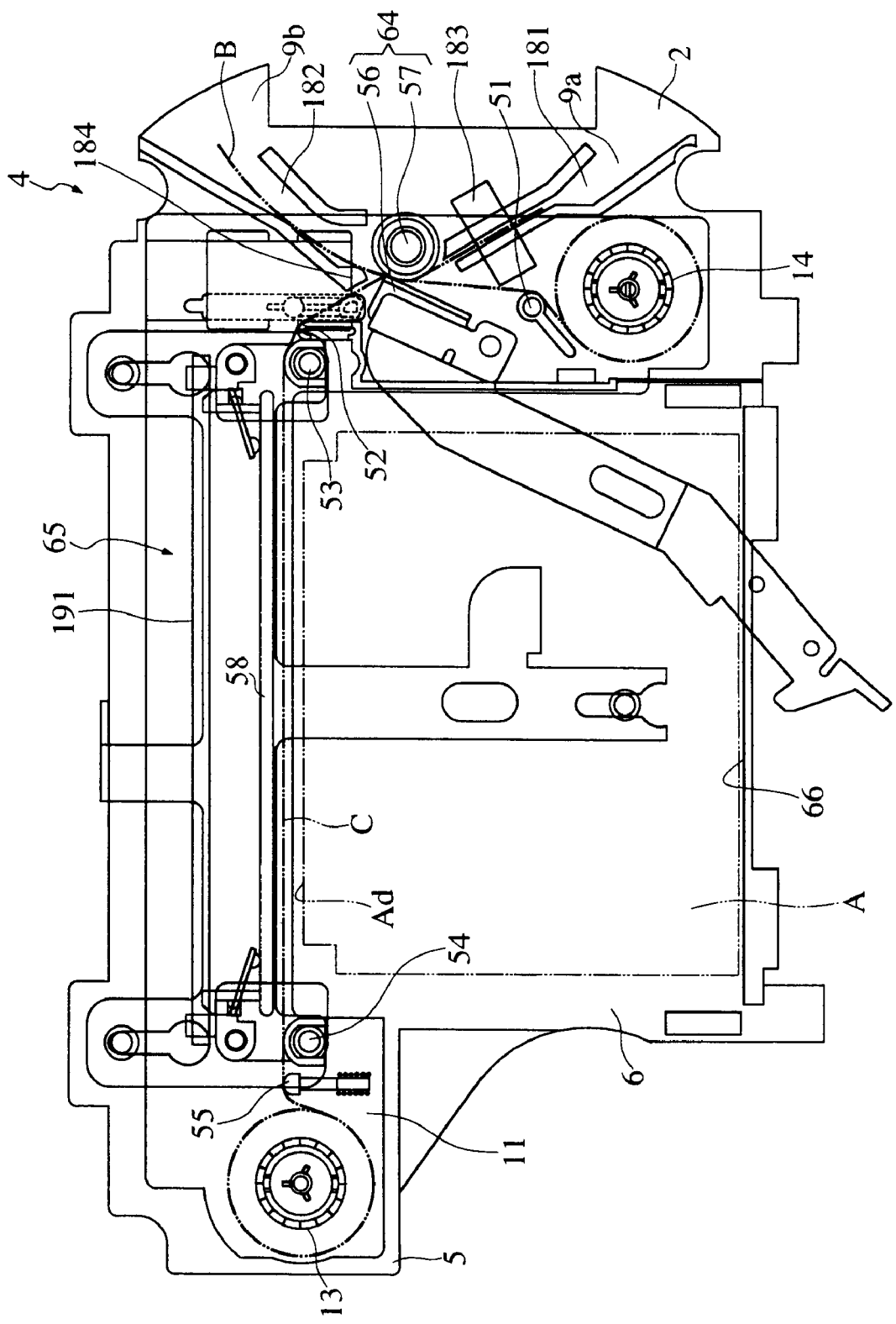
FIG. 2 is a plan view of an internal construction of a mechanical block of the stamp-making apparatus.

Now, a sequence of operations for making a stamp will be briefly described with reference to FIGS. 1A and 1B, and 2. First, the function switch 8 is rotated from "OFF" position as a standby position to "OPEN" position to open the lid 7, and a stamp body A is set in the pocket 6. As the stamp body A is set, the type of the stamp body A is detected by a stamp-detecting block 66 connected to the input interface 304 of the control block 300.

Then, the function switch 8 is rotated to "INPUT/PLATE-MAKING POSITION" to switch the function of the apparatus to plate-making, and the push button group 22 and the operating dial 23 are operated to input stamp characters. When the inputting of stamp characters is completed, the plate-making sheet B on which a stamp character label is provided is set by inserting the same into the inserting slot 9a.

Then, a predetermined button 22a of the push button group 22 is operated to cause the apparatus to execute the plate-making operation, i.e. printing of the stamp characters. The printing is effected simultaneously on the ink ribbon C and the plate-making sheet B. When the printing is completed, the ink ribbon (printed portion thereof) C is fed or advanced to set the same for exposure to ultraviolet rays, and at the same time plate-making sheet B is discharged from the take-out slot 9b. When it is confirmed by the plate-making sheet B discharged that there is no error in the printed stamp characters, the function switch 8 is rotated to the "EXPOSURE" position to switch the function of the apparatus to exposure, thereby causing an exposure block 65, later described, to expose the stamp body to ultraviolet rays.

When the exposure to ultraviolet rays is completed, the function switch 8 is rotated to the "OPEN" position to open the lid 7, and then the stamp body A is removed from the pocket 6 to wash the same. The washing completes the stamp. Before or after completion of the stamp, the stamp character label is peeled off the plate-making sheet B and attached on the back of the stamp.

Next, out of the components and elements of the stamp-making apparatus 1, those associated with the control block 300, described in detail hereinafter, will be described with reference to FIGS. 2 to 11, one by one.

The ribbon cartridge 11 is constructed such that it is removable from the mechanical block body 5, and the entire ribbon cartridge 11 may be replaced when the ink ribbon C is used up. As illustrated in FIG. 2, the ribbon cartridge 11 has a take-up reel 13 arranged at one end thereof and a supply reel 14 arranged at the other end thereof. The ink ribbon C is unrolled from the supply reel 14, fed along a feed path in the form of a rotation of an inverted-L shape as viewed in FIG. 2, and taken up by the take-up reel 13. The feed path in the form of a rotation of an inverted-L shape has a shorter side portion which a printing block 64, later described, faces and a longer side portion which the exposure block 65, later described, faces. The printing block 64 faces the ink ribbon C and the plate-making sheet B simultaneously, and the exposure block 65 faces the ink ribbon C printed with the image of the stamp characters.

The ink ribbon C is comprised of a transparent ribbon tape and ink coated thereon. In the present embodiment, it has a thickness of 6 µm. When the printing block 64 of the apparatus carries out printing on the ink ribbon C, a portion of ink coated on the ink ribbon, which defines a character, is transferred to the plate-making sheet B, whereby the ribbon tape of the ink ribbon C is formed with a negative image by a transparent portion from which the portion of ink defining the character has been transferred, while the plate-making sheet B is formed with a positive image by the transferred portion of ink defining the character. The ink ribbon C is sent forward to the exposure block 65 to use the resulting negative image-formed portion thereof as a mask in carrying out the exposure, while the plate-making sheet B is delivered from the apparatus for confirmation of the stamp characters and affixing the same to the stamp thus made.

Figure 4:
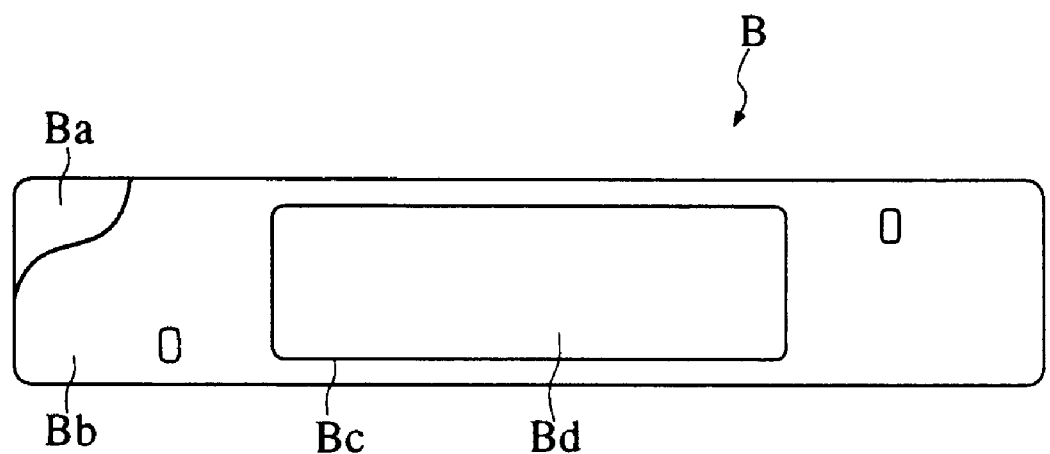
FIG. 4 is a view illustrating the structure of a plate-making sheet.

As illustrated in FIG. 4, the plate-making sheet B is a laminate of a base sheet Ba and an adhesive sheet Bb, generally in the form of a strip. The adhesive sheet Bb is formed with cutting lines Bc defining a rectangular area. The rectangular area of the adhesive sheet Bb is peeled off the base sheet Ba along the cutting lines Bc to form the stamp character label Bd to be affixed to the back of the stamp. There are provided several types of the stamp body A which are different in shape from each other according to the use of stamps, and there are also provided respective corresponding types of the plate-making sheet which are different in the shape of an area of the stamp character label Bd (shape and size of an area defined by cutting lines).

Figure 3:
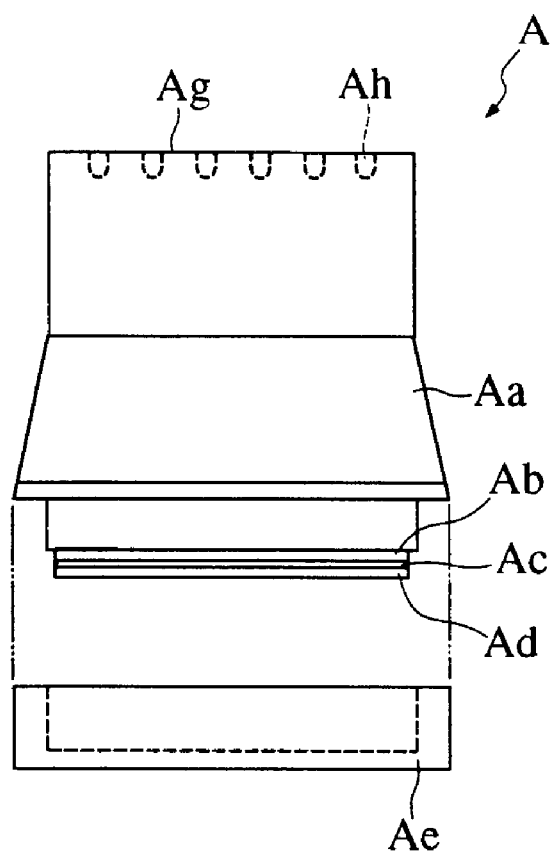
FIG. 3 is a view illustrating the structure of a stamp body.

On the other hand, as illustrated in FIG. 3, the stamp body A is comprised of a stock Aa (formed of a resin in the present embodiment), a thin sponge Ab (foamed urethane) affixed to a front end of the stock Aa, an ultraviolet-insensitive resin base Ac affixed to the sponge Ab, and an ultraviolet-curing resin affixed to the resin base Ac to form a stamp surface Ad. The ultraviolet-curing resin portion (stamp surface Ad) of the stamp body A is exposed to ultraviolet rays with the ink ribbon C as a mask, whereby portions of the stamp surface Ad corresponding to the stamp characters are cured. In this state, the stamp body A is taken out of the pocket 6, and washed with water to remove uncured portions of the stamp surface, which are soluble in water, from the stamp surface Ad. Thus the stamp is completed. Symbol Ae in the figure designates a cap made of resin.

Next, the printing block 64 will be described with reference to FIGS. 2 and 11. The printing block 64 includes a head-driving circuit 56a and a motor-driving circuit 57a both of which are connected to the output interface 305 of the control block 300, the print head (thermal head) 56 driven by the head-driving circuit 56a for printing stamp characters on the ink ribbon C, a platen roller 57 for feeding the ink ribbon C in a manner timed to printing operations of the print head 56, and a head temperature sensor 56b arranged on a head surface of the print head 56. Further, the casing 2 is formed with a feeding passage 181 through which the plate-making sheet B is fed to a contacting area between the print head 56 and the platen roller 57 and a delivery passage 182 through which the plate-making sheet B is delivered. The feeding passage 181 is formed with the inserting slot 9a which is open to the outside of the apparatus, at an upstream end thereof, and the delivery passage 182 is formed with the take-out slot 9b which is open to the outside of the apparatus, at a downstream end thereof.

The platen roller 57 is a drive roller as described hereinabove, and when the ink ribbon C is unrolled from the supply reel 14, it pulls in the plate-making sheet B between the print head 56 and itself to thereby bring a portion of the ink ribbon C and a portion of the plate-making sheet B, one upon the other, onto the print head 56. The print head 56 is a thermal head, and thermally transfers ink coated on the ribbon tape of the ink ribbon C to the plate-making sheet B. This transfer of the ink peels portions of ink corresponding to stamp characters off the ink ribbon C to reveal corresponding portions of the transparent base of the ribbon tape, while the peeled portions of the ink are attached to the plate-making sheet B as the stamp characters. The head surface temperature sensor 56b is formed by a temperature sensor, such as a thermistor, arranged on a surface of the print head 56 in an intimately contacting manner, and connected to the input interface 304 of the control block 300 for sending information on a temperature of the print head 56 detected thereby.

On the feeding passage 181 faces a sensor 183 which detects insertion of the plate-making sheet B and a feeding reference position of the same. The plate-making sheet B inserted into the feeding passage 181 is sent forward by the platen roller 57 depending on results of the detection of the sensor 183 whereby printing is started from one end of the stamp character label Bd. One of walls defining the delivery passage 182 on a left-hand side as viewed in FIG. 2 is formed with a separating nail 184 at an upstream end thereof, whereby the ink ribbon C and the plate-making sheet B being fed, one upon the other, are separated from each other. Thereafter, the ink ribbon C is sent forward to the exposure block, while the plate-making sheet B is delivered via the delivery passage 182 out of the apparatus.

Next, the exposure block 65 will be described with reference to FIGS. 2 and 11. The exposure block 65 includes a light source-driving circuit 191a connected to the output interface 305 of the control block 300, an ultraviolet ray source 191 arranged in a manner opposed to the stamp surface Ad of the stamp body A set in the pocket 6 and driven by the light source-driving circuit 191a, and a presser plate 58 arranged between the ultraviolet ray source 191 and the stamp surface Ad of the stamp body A. The ultraviolet ray source 191 is a self-heating hot-cathode tube called a semi-hot tube and supported on a fluorescent tube holder, not shown, provided on a base plate, not shown. The stamp surface Ad of the stamp body A, the presser plate 58, and the ultraviolet ray source 191 are arranged in parallel to each other with a gap between adjacent ones thereof. The ink ribbon C is fed between the stamp surface Ad and the presser plate 58.

The presser plate 58 is formed e.g. of a transparent resin, and moves forward (downward as viewed in FIG. 2) to urge the ink ribbon C against the stamp surface Ad of the stamp body A. More specifically, the exposure is carried out by causing the presser plate 58 to urge the ink ribbon C against the stamp surface Ad of the stamp body A, and lighting the ultraviolet ray source 191 to thereby irradiate the ink ribbon C with ultraviolet rays through the presser plate 58 (see FIG. 5). The exposure block 65 is provided with an ambient temperature sensor 67 which is connected to the input interface 304 of the control block 300, and sends information on a temperature of ambience of the exposure block 65 detected thereby to the input interface 304.

It should be noted that as the presser plate 58 is advanced, the first guide pin 53 and the second guide pin 54 are moved in the same direction. This movement decreases the tension of the ink ribbon C stretched between the first and second guide pins 53, 54, whereby the ink ribbon C is urged against the stamp surface Ad of the stamp body A with reduced tension, i.e. without forming any vertical wrinkles thereon.

Now, the above-mentioned state of the ink ribbon C is described in further detail with reference to FIGS. 2 and 5. Referring to FIG. 2, when the ink ribbon C is fed or advanced, the pulling force of the take-up reel 13 causes strong tension of the ink ribbon C, so that vertical wrinkles are formed on the ink ribbon C due to its very small thickness. Therefore, if the ink ribbon C is urged against the stamp surface Ad of the stamp body A as it is, there remain the wrinkles formed on the ink ribbon C urged against the stamp surface Ad, so that deformed images (negative) of the stamp characters on the ink ribbon C are used in carrying out the exposure of the stamp surface Ad to the ultraviolet rays. On the other hand, if the ink ribbon C is loosened, the exposure can be carried out with the images of the stamp characters being out of position. To eliminate these inconveniences, as illustrated in FIG. 5, the first guide pin 53 and the second guide pin 54 are moved forward in accordance with the forward movement of the presser plate 58, whereby the tension of the ink ribbon C is reduced, and at the same time, a slight stretching force is applied to the ink ribbon C by the tension pin 55, which is moderate enough not to produce any wrinkles on the ink ribbon C.

Figure 5:
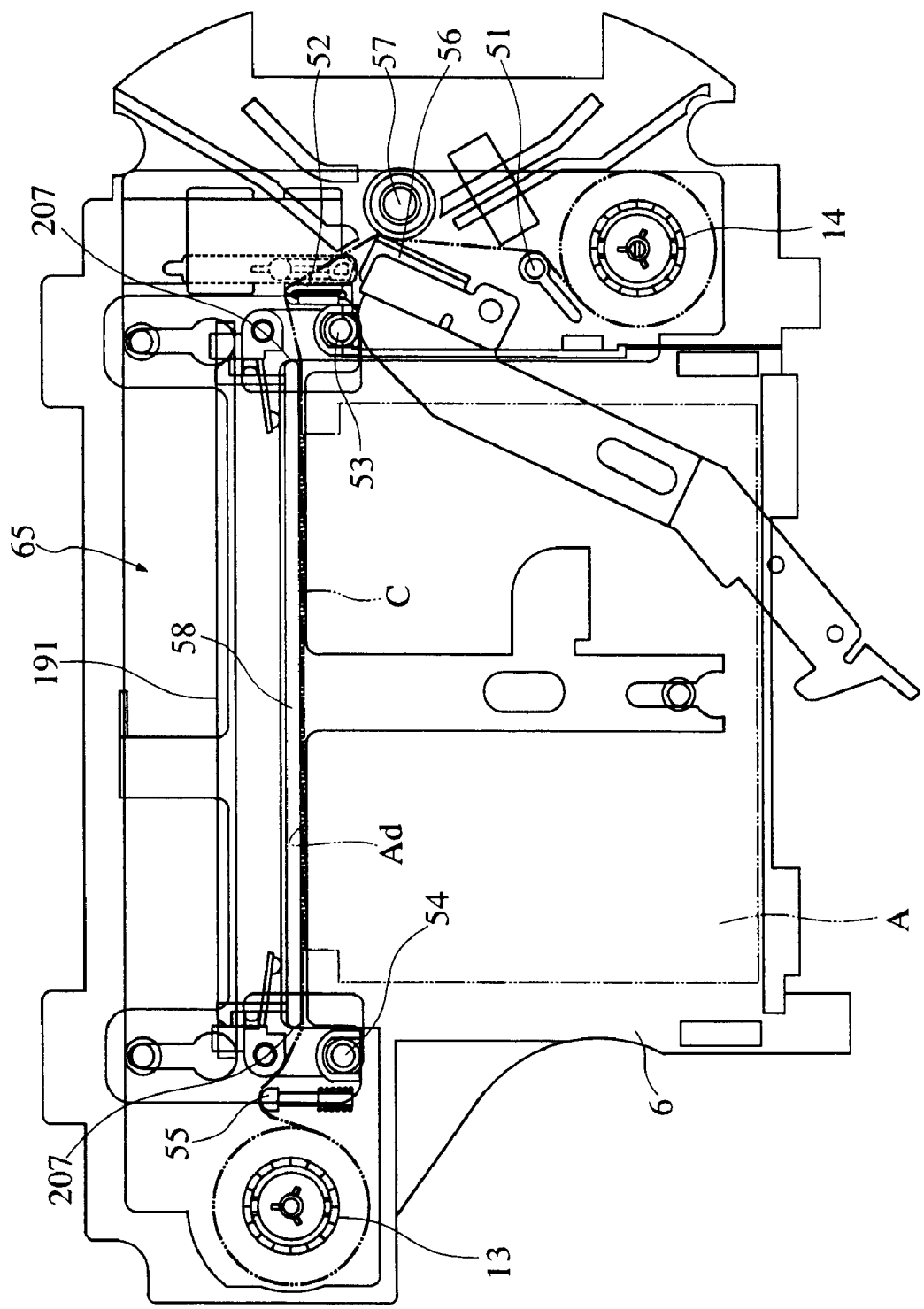
FIG. 5 is a plan view of an exposure system of the mechanical block and components associated therewith.
Figure 6:
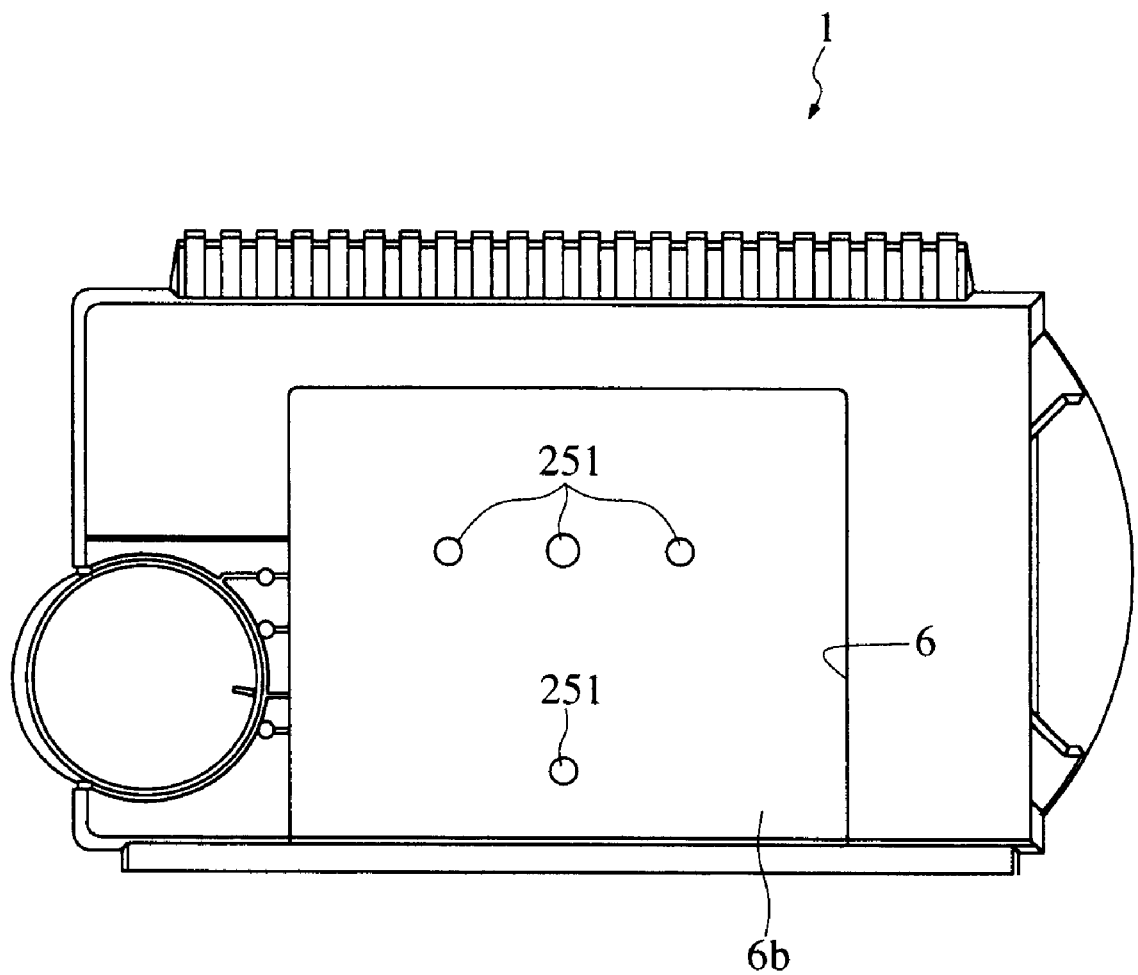
FIG. 6 is a plan view illustrating a pocket formed in the mechanical block with a lid removed therefrom.

Further, the ink ribbon C in the exposure position shown in FIG. 5 is bent backward at the longitudinal opposite ends of the presser plate 58 by the tension pin 55 and the second path-setting pin 52, and the chamfered portions 207 formed at the longitudinal opposite ends of the presser plate 58 operate to prevent undesired wrinkles from being produced on the ink ribbon C.

As described above, a positive image on the plate-making sheet B and a negative image on the ink ribbon C both formed by the printing are used as a stamp character label and an exposure mask, respectively. That is, the quality of these images directly reflects on the quality of a stamp as a final product. Especially, when the ink ribbon C, which is used as the exposure mask, is deformed, images of deformed characters are formed on the stamp body by the exposure. To eliminate this inconvenience, in addition to mechanical structural means for regulating the tension of the ink ribbon described above, electrical means of adjusting an amount of heat generated by the exposure process is provided to thereby prevent undesired wrinkles from being formed on the ink ribbon C.

Next, the stamp-detecting block 66, the operation of which is linked to the opening and closing of the lid 7, will be described. The stamp-detecting block 66 detects the mounting of the stamp body A in the pocket 6, and at the same time discriminates the type of the mounted stamp body A. The stamp body A includes various types having respective different shapes, e.g. ones for a square stamp, a personal name stamp, a business stamp, an address stamp, etc. The different types of stamp bodies A for respective types of stamps are identical in length, but different in width and thickness. It should be noted that the above "length" means a size of the stamp body A between the stamp surface Ad and a surface on an opposite side thereto (back surface Ag), the above "width" means a size of the stamp body A between surfaces of opposite lateral ends thereof in its position mounted in the pocket 6, and the above "thickness" means a size of the stamp body between an upper side surface and a lower side surface of the stamp body in its position mounted in the pocket 6. To set each of these various types of the stamp body A different in width and thickness to a fixed position with respect to the directions along the width and the thickness of the stamp body A, in the present embodiment, as illustrated in FIGS. 6 and 7A to 7D, four bosses 251, 251, 251, 251, long and short, are provided on the bottom 6b of the pocket 6 such that they extend perpendicularly upward from the bottom, and the stamp body A is formed with fitting holes Af for fitting corresponding ones of the bosses therein, respectively, (see FIG. 7A to 7D).

Figure 7A:
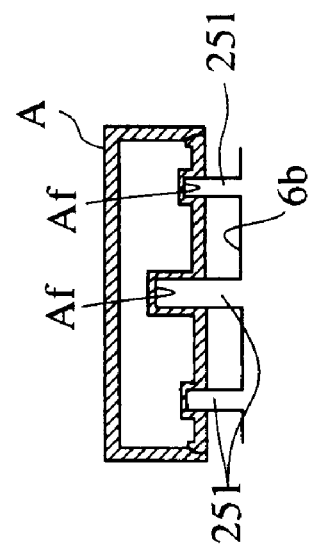
FIGS. 7A and 7B are explanatory diagrams for illustrating the construction of a stamp body of a square stamp when mounted in the pocket.
Figure 7C:
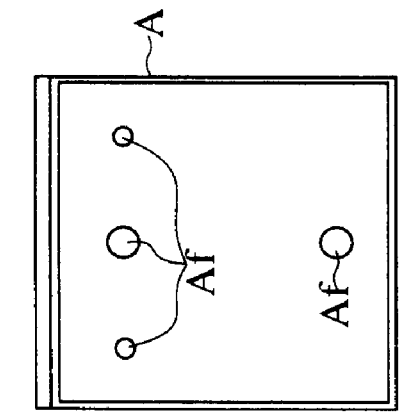
FIGS. 7C and 7D are explanatory diagrams for illustrating the construction of a stamp body of a business stamp when mounted in the pocket.
Figure 7B:
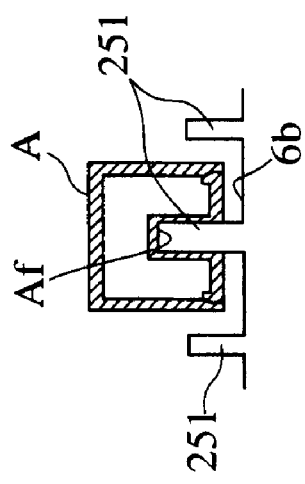
Figure 7D:
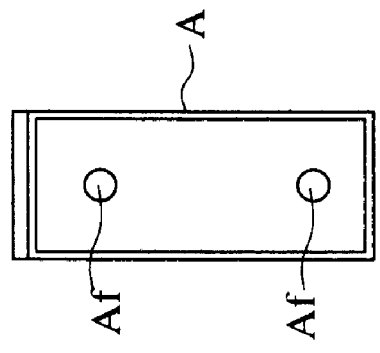

The four bosses 251, 251, 251, 251 are arranged to form a T shape, and in a manner corresponding thereto, a stamp body A for the square stamp, for example, is formed with two fitting holes Af, Af (see FIGS. 7A and 7B), and a stamp body A for the business stamp, for example, is formed with four fitting holes Af, Af, Af, Af (see FIGS. 7C and 7D). The number of the fitting holes Af and the depth of each of them depend on the type of the stamp body A, and this combination of the fitting holes Ag and the bosses 251 enables each stamp body A to be mounted in the pocket 6 such that the center of the stamp surface Ad of the stamp body A mounted in the pocket 6 is positioned to a fixed location.

Further, the back surface Ag on the opposite side to the stamp surface Ad is formed with a plurality of small holes Ah (type-detecting holes) arranged side by side at respective central locations along the width of the stamp body A. The small holes Ah cooperate with a switch array 262 of the stamp-detecting block 66, later described, to detect the type of the stamp body A (see FIGS. 8A to 8G). The stamp character label Bd of the plate-making sheet B printed with stamp characters and delivered to the outside of the apparatus separately from the ink ribbon C is affixed to the back surface Ag of the stamp body A, whereby the small holes Ah are concealed.

Figure 9:
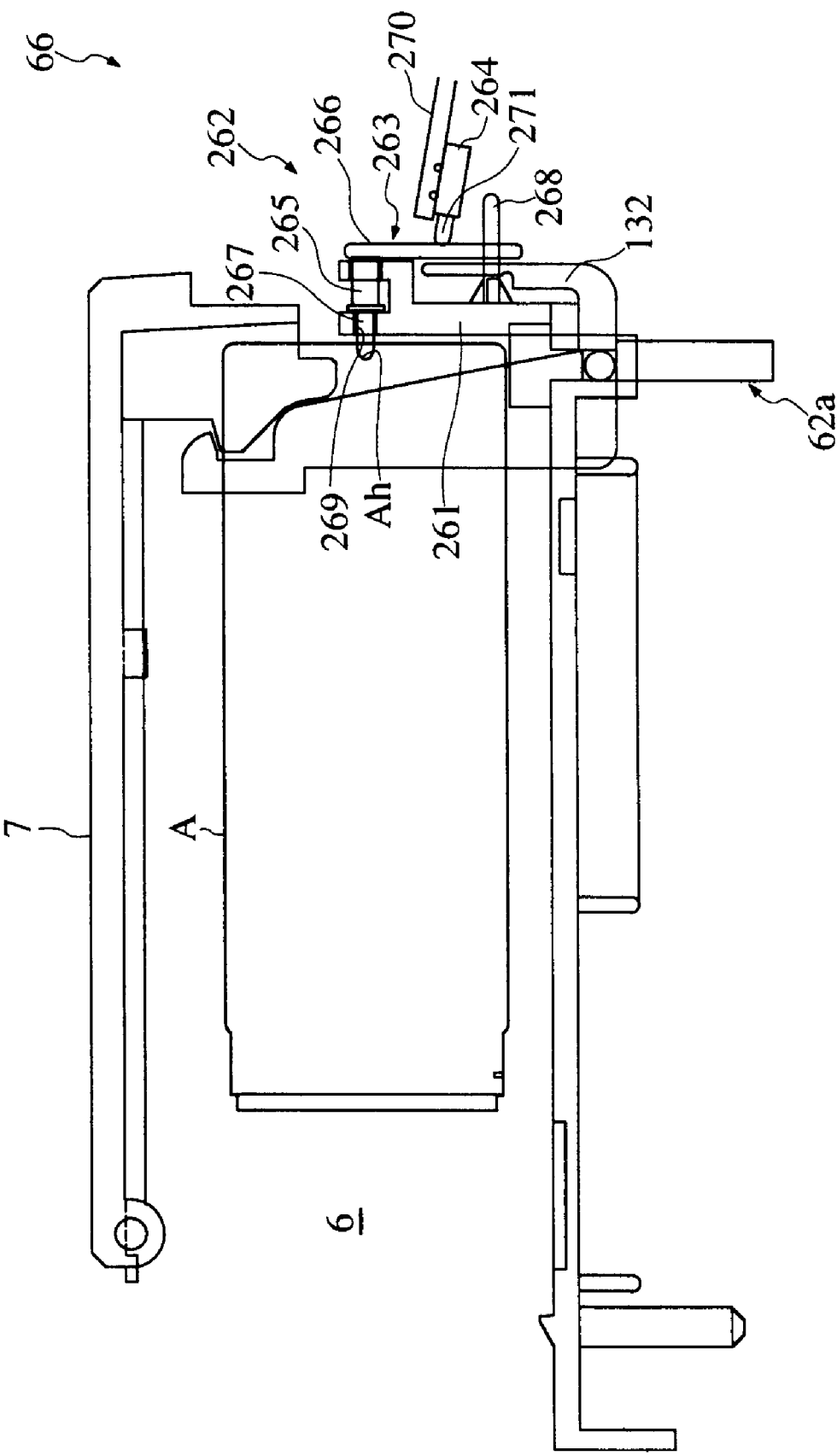
FIG. 9 is a cross-sectional view which is useful in explaining operations of a stamp-detecting block for detecting a stamp body.
Figure 10:
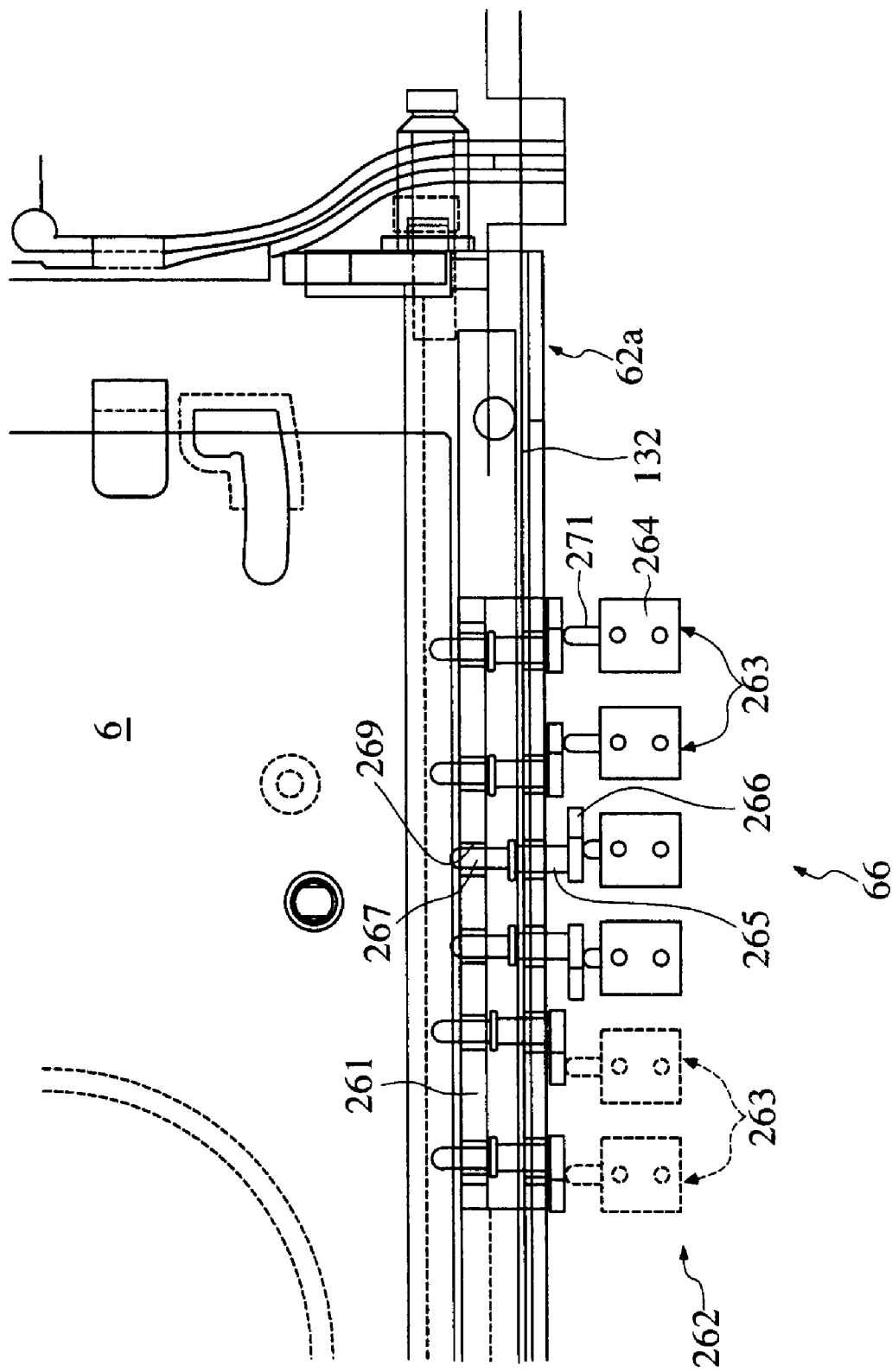
FIG. 10 is a partial plan view illustrating the pocket, the stamp-detecting block, and components associated therewith.

As illustrated in FIGS. 9 and 10, the stamp-detecting block 66 includes a switch holder 261 (also serving as a wall of the pocket 6) arranged such that it is opposed to the back surface Ag of the stamp body A when it is mounted in the pocket 6, and the switch array 262 formed of six detecting switches 263 supported on the switch holder 261. Each detecting switch 263 is comprised of a switch body 264 formed e.g. of a push switch, and a switch top 265 having one end for being projected into the pocket 6. The switch top 265 includes a plate portion 266 and a detecting projection 267 (including the one end) extending at a right angle to the plate portion 266, with a lower part of the plate portion 266 being guided by a guide projection 268 formed in the switch holder 261 and the detecting projection 267 being guided by a guide hole 269 formed through the switch holder 261 for forward and backward motions thereof.

The switch body 264 is fixed to the reverse side surface of a base plate 270 such that a plunger 271 thereof abuts the plate portion 266 of the switch top 265. The plunger 271 urges the switch top 265 toward the pocket 6 by the urging force generated by its spring, not shown. A state of the one end of the detecting projection 267 projected into the pocket 6 via the guide hole 269 through the switch holder 261, and a state of the same being retracted against the urging force of the plunger 271 correspond to ON-OFF states of the detecting switch 263, respectively. Actually, when any of the detecting switches 263 of the switch array 262 is turned on, mounting of the stamp body A is detected, whereas when all of the detecting switches 263 are turned off, removal of the stamp body A is detected. The detecting switches 263 of the switch array 262 are each in ON or OFF state depending on whether a corresponding small hole Ah exists in the stamp body A. Therefore, the type of the stamp body A can be determined from a pattern of ON/OFF states of the six detecting switches 263.

FIGS. 8A to 8G illustrate the relationship between small holes Ah in the stamp body A and the six detecting switches 263 (detecting projections 267). Provision of the six detecting switches 263 for detecting presence or absence of the small holes Ah makes it possible to detect 2n−1 (n=6), i.e. 63 types of patterns. A stamp body A for a square stamp or the like, which is small in width, has no small holes Ah corresponding to two outermost detecting switches 263, 263 on respective opposite sides, and the two detecting switches 263, 263 project into space at opposite locations outside the stamp body A. That is, a stamp body A having a small width, such as a stamp body A for a square stamp, is recognized by a pattern for a stamp body A having imaginary small holes Ah at outermost locations thereof.

Next, the control block 300 will be described with reference to FIG. 11. The control block 300 is based on, e.g. a microcomputer, and includes a CPU 301, a ROM 302, an input interface 304, an output interface 305, and a system bus 306 connecting all these devices to each other.

The ROM 302 stores various programs, dictionary data for kana-kanji character conversion, font data of characters, symbols, etc. and fixed data, such as data of a predetermined stamp frame. The RAM 303 is used as a working area, and also as means for storing fixed data input by a user. The data stored in the RAM 303 is backed up even when the power is turned off.

The input interface 304 interfaces to fetch signals from the function switch 8, the push button group 22 and the operating dial 23 of the operating block 21, the head surface temperature sensor 56b of the printing block 64, the ambient temperature sensor 67 of the exposure block 65, and the stamp-detecting block 66, via the system bus 306 into the CPU 301 or the RAM. The output interface 305 interfaces to deliver control signals and data used in control operations received via the system bus 306 from the CPU 301, the ROM 302, and the RAM 303 to the light-emitting elements 12, the display-driving circuit 24a of the operating block 21, the head-driving circuit 56a of the printing block 64, the motor-driving circuit 57a, the light source-driving circuit 191a of the exposure block 65, etc.

The CPU 301 carries out processing based on input signals from the input interface 304, and a processing program stored within the ROM 302 and selected according to the processing on each occasion, using the RAM 303 as the working area, and fixed data stored within the ROM 302 and the RAM 303, as needed.

The stamp-making apparatus 1 of the present embodiment carries out multitask processing in the following manner:

FIG. 12 illustrates a conceptual representation of the multitasking of the present embodiment. A plurality of tasks to be executed are classified into groups having respective priorities RDY0 to RDYn (in the case of the illustrated example, n =7), and the order of processing of tasks is determined based on the priorities to thereby activate each task. In the following description, tasks assigned the highest priority RDY0 are designated as TCB0i (i=0, 1, 2, . . . ), and tasks assigned the lowest priority are designated as TCB7i. In general, a task assigned the priority RDYj (j=0 to 7) is designated as TCBji. Further, when a task is classified into a group having the priority RDYj, and placed in a wait state in this group, i.e. in the priority, this state will be described e.g. as "a task TCBm0 is registered as TCBj0". When one or more tasks assigned the priority RDYj are registered, it will be expressed as "task existing in RDYj".

Further, as illustrated in FIG. 12, in the multitasking, an area is set aside for registering a name of each task (e.g. TCBm0 shown in the figure) created for execution in response to an event, such as an interrupt, generated e.g. by depression of any of the push buttons of the push button group 22 or operation of the operating dial 23, and for registering a communication task between tasks (e.g. Mailm1 illustrated in the figure; hereinafter simply referred to as a "mail"). This area will be referred to as "mail box MBX" in the following description. Further, the name of a task representative of the contents of current or actual processing is expressed as TCBr0, and execution of this task for processing is expressed as "the active task run processing", or "the RUN processing" in an abbreviated form. For example, when a task TCB00 is selected and activated, it will be expressed as "the task TCB00 is registered as TCBr0 and activated". This registration is shown as "TCBr0←TCB00" in hierarchical operation diagrams, later described, and flow charts. The task TCBm0 in the mailbox MBX contains information concerning whether the task TCBr0 currently being executed should be forcedly interrupted or not, and which priority RDYi it should be registered in, and in MBX processing, later described, the task TCBm0 is executed according to these pieces of information.

Figure 13:
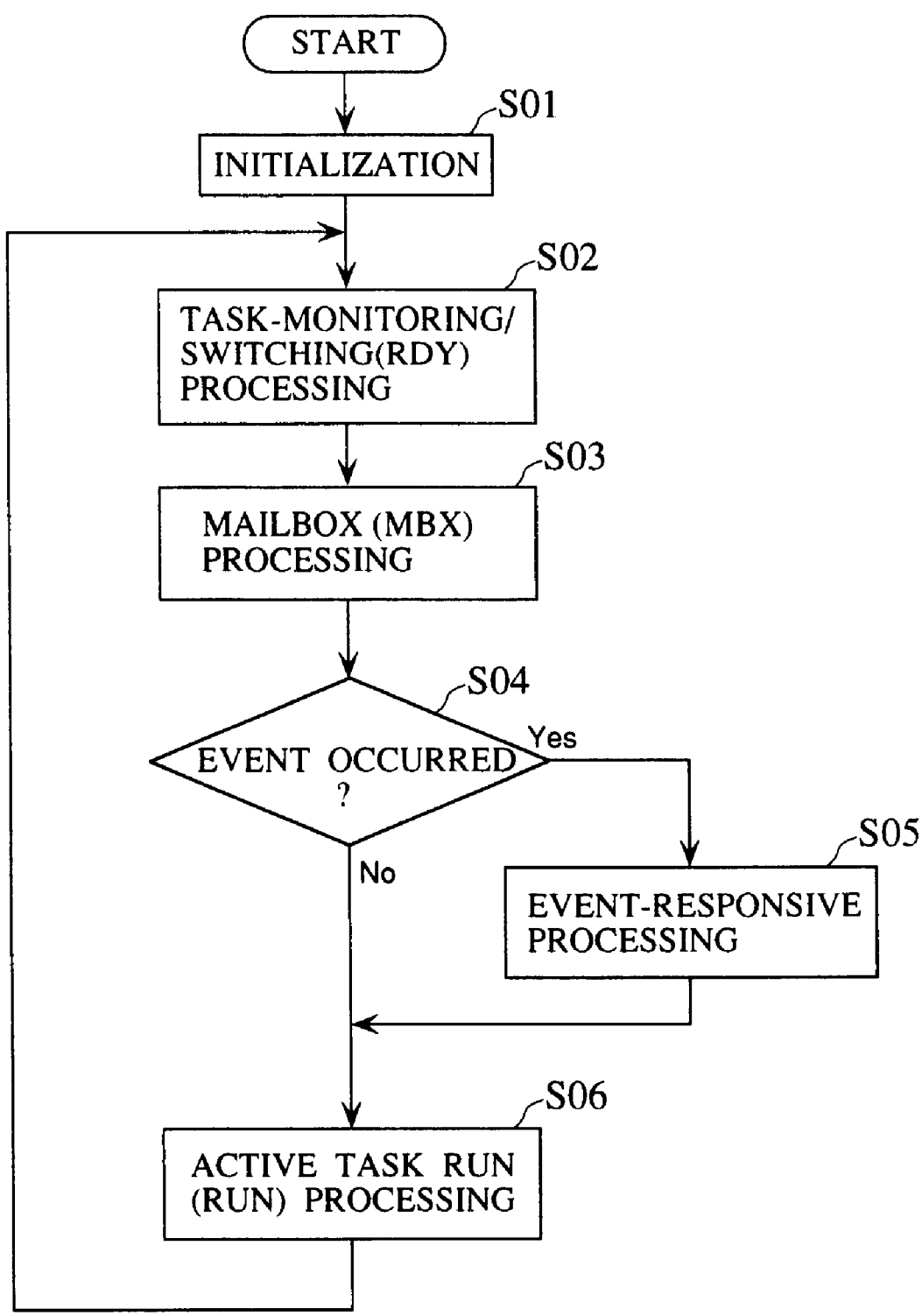
FIG. 13 is a flow chart illustrating an outline of the overall processing of the stamp-making apparatus.

FIG. 13 illustrates a procedure of processing executed according to the embodiment of the present embodiment, expressed in the form of an ordinary flow chart. As illustrated in the figure, when the stamp-making apparatus 1 is powered on to start the processing, an initialization of each device of the stamp-making apparatus is first executed at step S01, task-monitoring/switching (RDY) processing at step S02, and mailbox (MBX) processing at step S03. Then, it is determined at step S04 whether or not any event has occurred. If an event has occurred, event-responsive processing is executed at step S05, and thereafter, the active task run (RUN) processing is executed at step S06. Then, the RDY processing (step S02) to the RUN processing (step S06) are repeatedly executed.

However, in the actual processing, the RDY processing and the MBX processing are executed only at predetermined regular timing, but event-responsive processing is started upon occurrence of the event, while the RUN processing is executed during execution of the other processing. Therefore, the present multitasking cannot be expressed accurate enough by the above flow chart, and the hierarchical structure of the program is difficult to understand therefrom. Therefore, in the following description, when a sequence of steps of a task is described, a flow chart is employed which illustrates a task actually executed by activating another task for the multitasking as a subroutine. Event-driven type tasks, i.e. tasks which are initiated or activated in response to respective events, are described by a description method used in a diagram of FIG. 14 (hereinafter referred to as "the hierarchical operation diagram").

Figure 14:
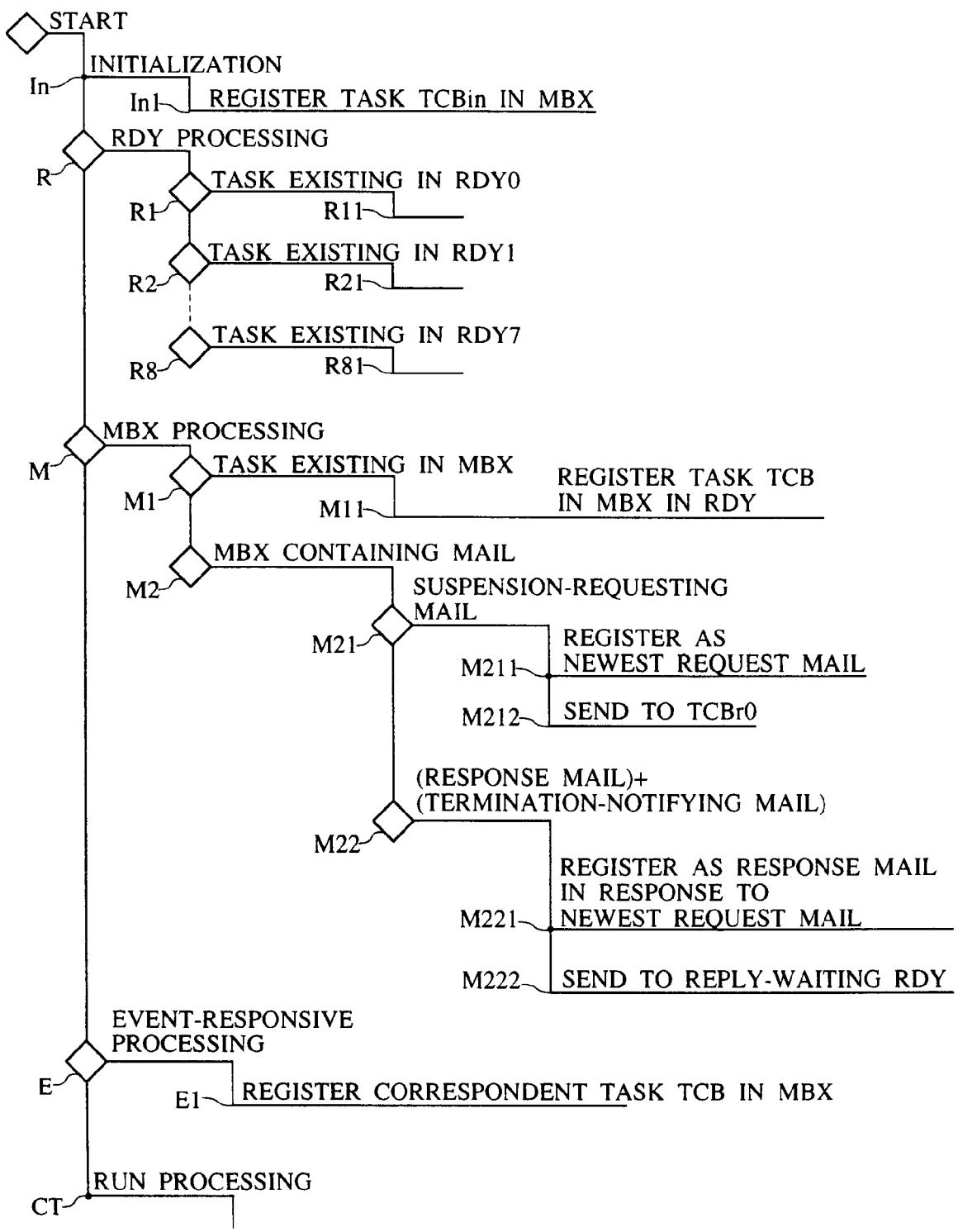
FIG. 14 is a hierarchical operation diagram illustrating main tasks executed in the stamp-making apparatus.

In the hierarchical operation diagram, each processing branch point designated by symbol ◊ represents a task, a program, or a subroutine, which is of an event-driven type i.e. executed when an event, such as an interrupt or activation of a task initiated by another task, has occurred. The task-monitoring/switching (RDY) processing illustrated in FIG. 14 is started only when an interrupt is generated at regular time intervals e.g. through a real time monitoring. Further, the mailbox (MBX) processing is also started by an interrupt generated at regular time intervals other than the regular time intervals of the PDY processing. The event-responsive processing registers various events, such as tasks initiated by operations of the operating dial 23, in the mailbox MBX. Although only one routine is illustrated in FIG. 14 as a representative, actually, the mailbox MBX is accessed for registration of the name of a task to be executed in response to each event independently whenever the event occurs.

As illustrated in FIG. 14, when the program is started by turning on the power, first, the initialization at a processing branch point In (hereinafter referred to as "the initialization (In)") is executed. The initialization (In) registers a task TCBin of main tasks-starting processing in the mailbox MBX (In1). When the initialization (In) is terminated, if it is neither time for the RDY processing nor time for the MBX processing, or any other event has not occurred, then the program proceeds to the RUN processing (CT). However, at this time point of the present case, there is no task registered, so that time for starting the RDY processing or the MBX processing is awaited.

In this state, when it becomes time for the RDY processing, the RDY processing (R) is executed, but there are no tasks registered in the priorities RDY0 to RDY7, i.e. no tasks exist in the priorities RDY0 to RDY7 (R1 to R8), so that the RDY processing is terminated without executing any specific processing. On the other hand, when it is time for the MBX processing, the MBX processing (M) is executed, and according to the task TCBin for starting main tasks, which has been registered as TCBm0 in the mailbox MBX, the processing of "task existing in MBX (M1)" is executed to register the task TCB of the mailbox MBX in the priority RDY (M11). Specifically, if the priority specified for the task TCBin corresponds to the priority RDY4, the task TCBin is registered as TCB40 in the priority RDY4.

Figure 15:
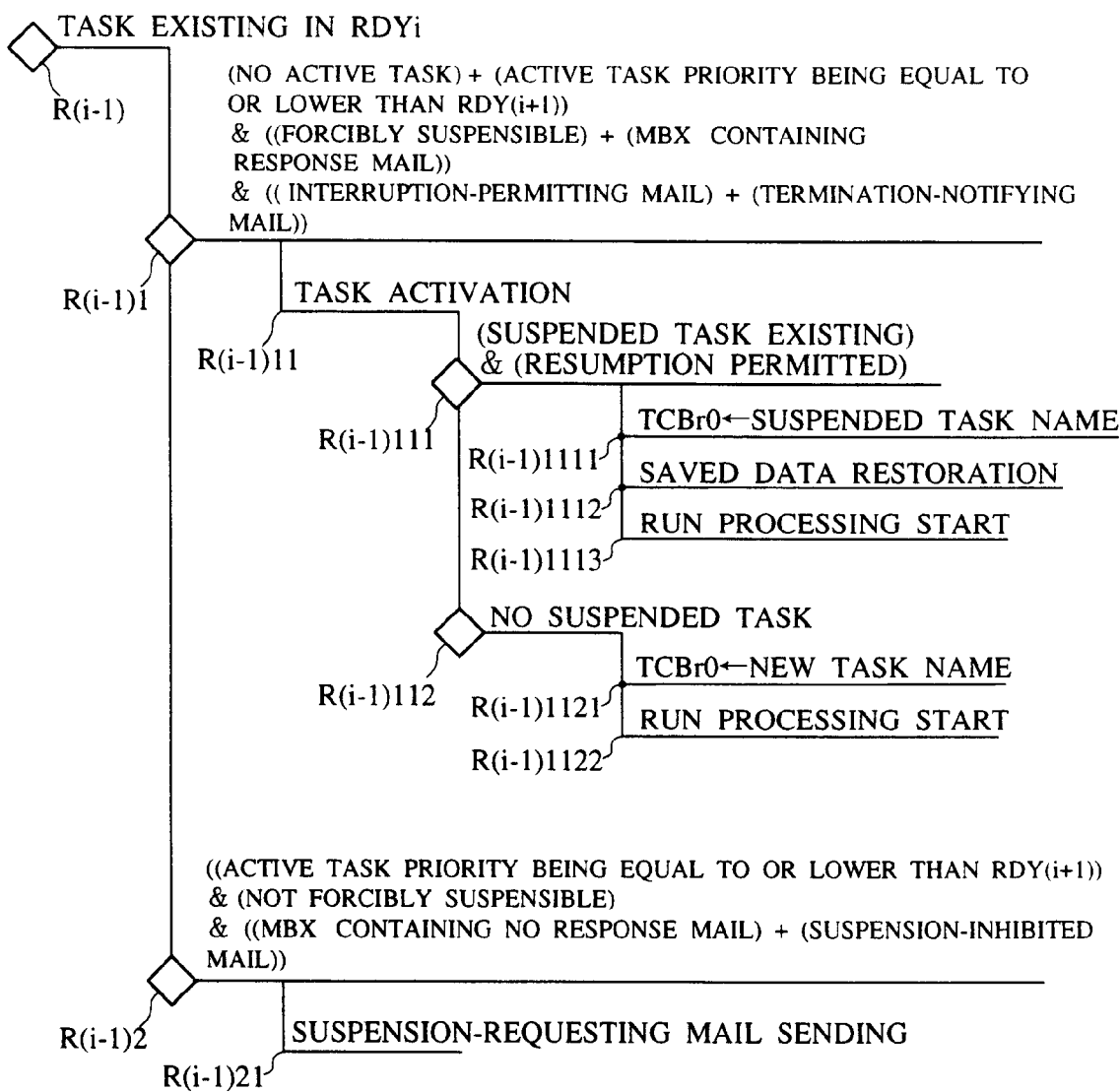
FIG. 15 is a hierarchical operation diagram of task-monitoring/switching processing executed in the stamp-making apparatus.

In this state, when it is time for the RDY processing, the RDY processing (R), e.g. the processing of "task existing in RDY4 (R3)" is executed. Now, the processing of "task existing in RDYi (R(i−1))" will be described with reference to FIG. 15. This processing generally branches into a case of activating a new task, a case of sending a suspension-requesting mail to the active task without starting a task, and a case of executing no processing.

First, if there is no active task, i.e. if there is no task registered as TCBr0, and hence the RUN processing is not being executed, or if the active task TCBr1 has a priority equal to or lower than the priority RDY(i+1), and at the same time, the active task is suspensible, another task is started. The term "suspensible" means that the task to be activated can forcibly interrupt execution of the active task, or that a response mail in response to the suspension-requesting mail is an interruption-permitting mail or a termination-notifying mail indicative of termination of the active task. Under the above-mentioned condition, i.e. when the conditions expressed by (no active task)+(active task priority being equal to or lower than RDY(i+1)) & ((forcibly suspensible)+ (MBX containing response mail) & ((interruption-permitting mail)+(termination-notifying mail)) are fulfilled at R(i−1)1, the new task is activated at R(i−1)11. Here, "+" represents a logical sum, while "&" a logical product.

On the other hand, a suspension-requesting mail is sent to the mailbox MBX, if the priority of the active task is equal to or lower than RDY(i+1), and at the same time there is no response mail from the active task so that it is not known whether the active task is suspensible or not, or the situation requires to again send the suspension-requesting mail after a response mail saying that the active task is not suspensible was received in response to the preceding suspension-requesting mail. That is, if the conditions expressed by (active task priority being equal to or lower than RDY(i+1) & (not forcibly suspensible) & ((MBX containing no response mail)+(suspension-inhibited mail)) are fulfilled at R(i−1)2, a suspension-requesting mail is sent at R(i−1)21. If neither of the above two sets of conditions are fulfilled, i.e. if the active task priority is equal to or higher than RDYi, no particular processing is executed, but the processing of "task existing in RDYi (R(i−1))" is terminated.

In the new task activation (R(i−1)11), if there exists any other task which has been suspended to activate a task higher in priority, or to start a subtask and wait for results of processing by the subtask, it is determined e.g. from resumption information, later described, whether the suspended task can be resumed or not. If the suspended task can be resumed, the processing of (suspended task existing) & (resumption permitted) (R(i−1)111) is executed. In this processing, the suspended task is registered as the active task TCBr0 at R(i−1)111, and if there are any saved data or the like, these data are restored or returned at R(i−1)1112, followed by newly starting the RUN processing at R(i−1)1113. The generation of this event causes the new task activation (CT1) to be activated in the RUN processing (CT), later described.

When there is no suspended task, the processing of "no suspended task" is executed at R(i−1)112, and after the processing of "TCBr0←new task name" is executed at R(i−1)1112, the RUN processing is started again at R(i−1) 1122. For example, when the task TCBin for activating the main tasks is to be executed, in the processing of new task activation (R311), the processing of "TCBr0←TCBin (R31121)" is executed in "no suspended task (R3112)", and then the RUN processing is started at R31122.

On the other hand, if there is a suspended task but the resumption of the suspended task is inhibited, the permission of resuming the suspended work has to be awaited, so that the new task activation (R(i–1)11) is terminated without executing any processing. It should be noted that since the above-mentioned subtask is normally set to a higher priority than the originating task, it is a general tendency that the subtask has already been terminated when the task initiation (R(i–1)11) is processed, thus permitting the originating task to be resumed.

Next, the mailbox (MBX) processing will be described with reference to FIG. 14. In this processing, in the case of "task existing in MBX (M1)", the task TCBm0 in the mailbox MBX is registered at M11 in a priority RDYj according to a priority specified for the task. In the case of "MBX containing mail (M2)", if the mail is a suspension-requesting mail (M21), it is registered as the latest request mail at M211, and sent to the active task TCBr0 at M212, whereas if the mail fulfills the conditions expressed by "(response mail)+(termination-notifying mail)" at M22, it is registered as a response mail in response to the latest request mail (at M221) and sent to a reply-waiting RDY (at M222).

Next, the event-responsive processing (E) will be described. Although the initialization (In) is described as a different kind of processing from this processing for the convenience of explanation, it is actually a kind of event-responsive processing (E). That is, the event-responsive processing (E) registers a task created by an event from the outside of the CPU, such as a manipulation of the operating dial 23, or a task created for execution of a program for internal processing, in the mailbox MBX at E1. For example, after registration in the mailbox MBX, the task TCBin for starting the main tasks is registered in the priority RDY, and then executed as a new task by the (RUN) processing described below.

Figure 16:
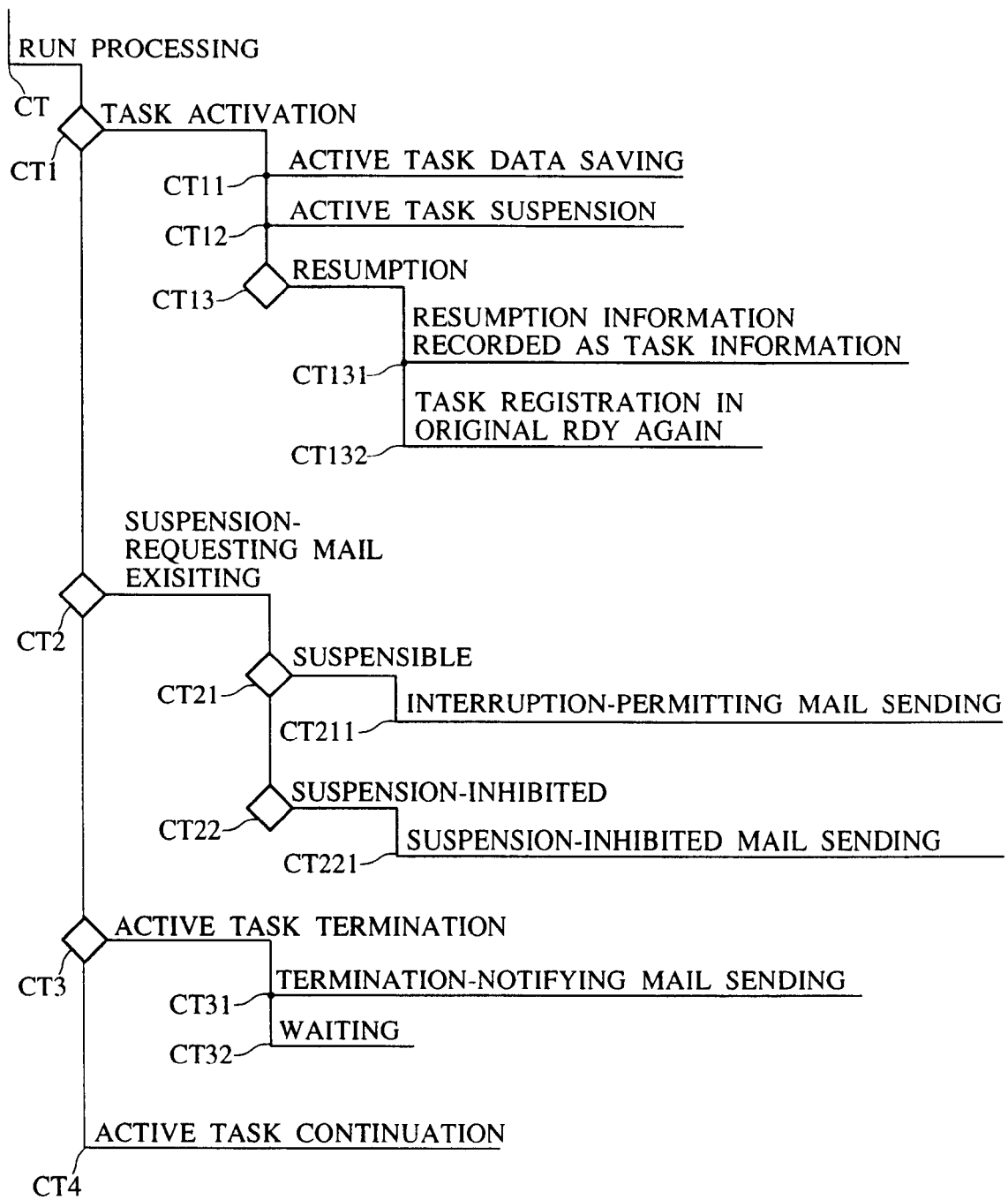
FIG. 16 is a hierarchical operation diagram of active task-executing processing executed in the stamp-making apparatus.

Now, the active task run (RUN) processing (CT) will be described with reference to FIG. 16. This processing continues the active task TCBr0 when there is no other event generated as described above. During this processing, there occur events of "task activation (CT1)", "suspension-requesting mail existing (CT2)" and "active task termination (CT3)". If these events do not occur, the processing of the active task is continued at CT4. If another task is to be activated at CT1, data of the active task being executed is saved at CT11, and then the active task is suspended at CT12. If resumption of the task is expected at CT13, resumption information is recorded as task information at CT131, based on which the task is registered again in the original priority RDY at CT132.

When the suspension-requesting mail existing at CT2, it is determined whether or not the active task is in a suspensible state. If the active task is suspensible at CT21, an interruption-permitting mail is sent to the mailbox MBX at CT211, while if it is not suspensible at CT22, a suspension-inhibited mail is sent at CT221. It should be noted that although similar processing is executed to temporarily suspend the RUN processing, when the RUN processing (CT) being executed is switched to the RDY processing (R), the MBX processing (M) or the event-responsive processing (E), this processing is a basic routine for real-time monitoring which is different from the processing of switching to the other tasks, and hence description thereof is omitted. When the active task TCBr is terminated at CT3, the termination-notifying mail is transmitted to the mailbox at MBX CT31, and the following task activation is awaited at CT32.

Figure 17:
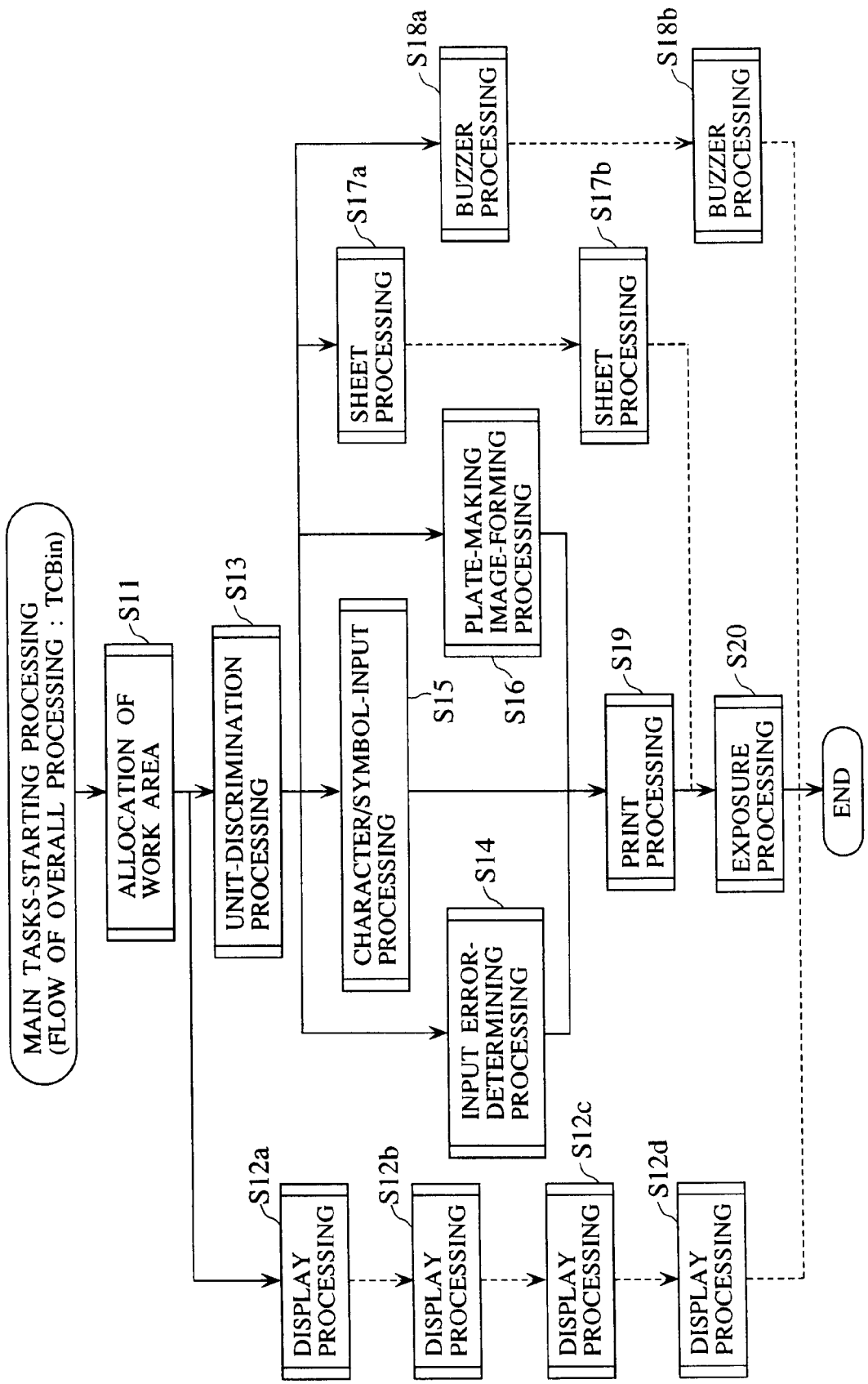
FIG. 17 is a flow chart of an example of main tasks-starting processing executed in the stamp-making apparatus.

FIG. 17 illustrates an example of the main tasks-starting processing. As illustrated in the figure, when the main tasks-starting processing task TCBin is activated, a task of allocating work area is first registered in the mailbox MBX at step S11, and then a task of display processing and a task of unit (stamp body)-discriminating processing are registered in the mailbox MBX at respective steps S12 and S13. Then, a task of input error-determining processing is registered at step S14, a task of character/symbol-input processing at step S15, a task of plate-making image (stamp image)-forming processing at step S16, a task of sheet processing at step S17, and a task of buzzer processing at step S18. Then, after a task of print processing is registered at step S19, a task of exposure processing is registered at step S20. The MBX processing classifies these subtasks according to the order of priority and registers each of them in a proper priority RDYj, and then the RDY processing causes them to be activated one after another. Further, after these subtasks are started, subtasks of the subtasks are registered in the mailbox MBX as required and each of them is activated by the RDY processing.

Stated another way, a plurality of tasks including the task TCBin of the initialization continue to be executed until they are each eventually placed in a wait state by any reasons. The internal processing of the stamp-making apparatus 1 proceeds to a next step by the multitasking described above when another task as a cause of the wait state of a task has progressed to be deactivated, so that eventually, the internal processing of the multitasking enters a state in which an entry or other manipulation by the user is awaited. Conversely, once the user manipulates the stamp-making apparatus 1, the tasks therefor including error handling tasks are sequentially carried out, and eventually the program enters a state in which another manipulation by the user is awaited.

Therefore, the user actually feels that various processing operations or tasks are executed in parallel and simultaneously. More specifically, according to the processing of the present stamp-making apparatus 1, compared with a manner of processing in which the processing proceeds to a next step each time only in response to a manipulation by the user, various kinds of processing operations which will be required to be executed later can be executed in advance, whereby a time period during which the man or user has to wait can be minimized, enabling high-speed processing to be attained. It should be noted that parallel processing, such as the multitasking processing described above, can be realized by forming the program or all the tasks described above by interrupt handlers and employing an interrupt control circuit which controls the order of priority of interrupts generated.

The dotted lines in FIG. 17 show that tasks appear to be simultaneously executed in parallel with each other. Further, the task of character/symbol-input processing (step S15), the task of input error-determining processing (step S14), and the task of plate-making image-forming processing (step S16) are simultaneously executed. More specifically, after a first entry of characters or the like (letters, symbols, figures, or the like) is effected, and before the following entry of characters or the like is effected (step S15), it is determined at step S14 whether or not there is an inconvenience in the number of characters entered in a text, and an image for use in the plate-making is formed at step S16. In the course of executing these steps, if a character entry is carried out at step S15, the task of the input error-determining processing (S14) and that of the plate-making image-forming processing (step S16) are immediately stopped, and then resumed from the start thereof. In the meanwhile, the display processing (step S12, shown as S12*a* to S12*d*) and the buzzer processing (step S18, shown as S18*a* and S18*b*), further, the sheet processing (step S17, shown as S17*a* and S17*b*)

responsive to insertion of the plate-making sheet, are being executed in parallel with the above steps.

Figure 18A:
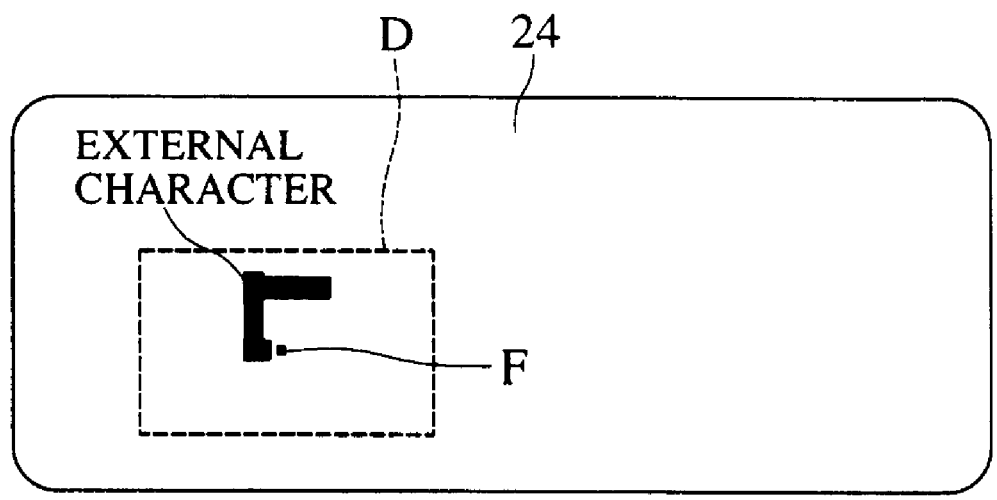
FIGS. 18A and 18B are explanatory diagrams illustrating an outline of an external character creating method according to the present invention.
Figure 18B:
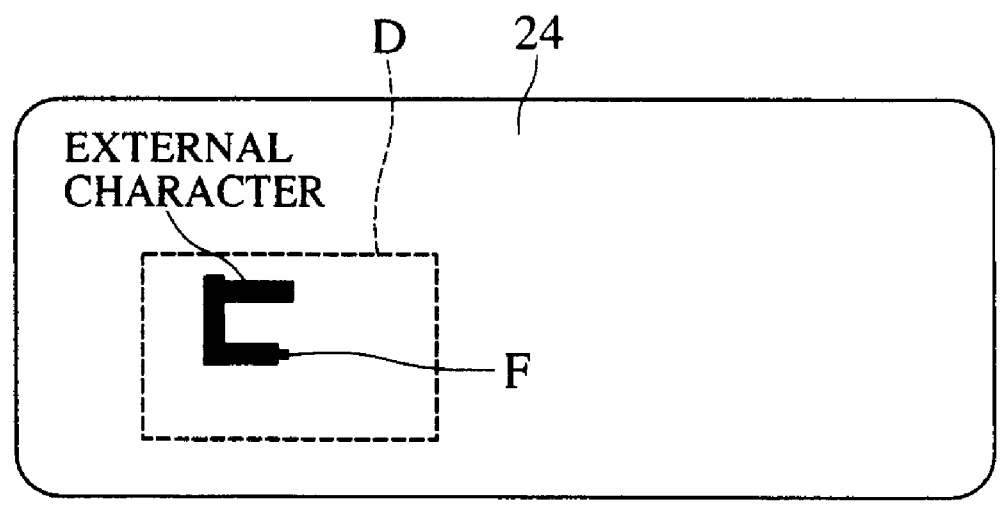

Next, an embodiment of an external character creating method in the image forming apparatus according to the present invention will be first outlined with reference to FIGS. 18A and 18B and then described in greater detail with reference to FIGS. 19–25D.

Generally, when the user requires a character pattern which has not been previously stored in a memory in a personal computer, a word processor, or the like, the user newly creates the character pattern, i.e., an external character for his personal use. In this event, when the user calls a function of creating an external character from the apparatus, a specifying area for defining an external character is displayed on the screen of a display. Then, the user moves a dot-shaped cursor in the vertical and horizontal directions within the specifying area to create a desired external character.

The external character creating method according to the present invention, on the contrary, locates a cursor at a fixed position within a specifying area reserved on the screen of a display, and scrolls displayed image data (external character data) in the vertical and horizontal directions to create an external character. For example, as illustrated in FIGS. 18A and 18B, when an external character E is created in a specifying area D on a display 24, the operation dial 23 and a button 22a illustrated in FIG. 1 are manipulated to scroll external character data displayed in the specifying area D in the vertical and horizontal directions to create the external character E. In this event, a dot-shaped cursor F does not move but remains at a home position located substantially at the center on the screen of the display 24, while the external character data moves from a situation illustrated in FIG. 18A to a situation illustrated in FIG. 18B.

In this way, the external character data displayed in the specifying area for creating an external character is scrolled in the vertical and horizontal directions to create an external character without moving the position of the cursor on the screen of the display 24. Since the cursor always remains at the fixed position, the user does never lose the cursor and can create an external character in a readily viewable situation even with a small specifying area for creating an external character and hence with an extremely small cursor.

Next, a specific processing procedure for creating an external character will be described in greater detail with reference to FIGS. 19–25D. When a predetermined button 22a is depressed during the execution of the task of the character input processing (S15) previously described in connection with FIG. 17, a preceding input mode in the character input processing (STEP S15), for example, either of "Description" for allowing the user to input a hiragana or the like, "Symbol" for allowing the user to input a symbol or the like, "Figure" for allowing the user to input a figure such as an illustration or the like, . . . , and "External Character" is displayed on the display 24. Since a manipulation on the cursor/conversion key 32 or the character input key 33 in this display state causes the displayed contents to change, "External Character" is selected as the displayed contents using the keys, and the execution key 31 is depressed, resulting in displaying lower level options derived from the option "External Character", for example, "Registration", "Modification", "Call", "Copy", "Delete", and so on.

If "Registration" is selected and the execution key 31 is depressed in a similar manner in the above-mentioned display, an external character management mode is set to "Registration of External Character", and registration numbers, which constitute still lower level options, are displayed. In this event, within registration numbers for external character data which can be registered as external characters, unregistered registration numbers are displayed, so that a registration number to be registered this time is selected from the displayed ones in a similar manner, and the execution key 31 is subsequently depressed. As a result, the selection in the external character management mode is terminated, and external character registration processing, illustrated in FIG. 19, is started as a subtask of the character input processing (step S15).

As described above, since the input error-determining processing (step S14) is executed in parallel with the character input processing (step S15), an error is displayed if there is no unregistered registration number at the time the option "Registration" is selected. In addition, the setting of the external character management mode to "Registration of External Character" is canceled, and the remaining options within the options of "External Character", for example, "Modification", "Call", "Copy", "Delete", and so on are displayed. In this event, the user may select one of the remaining options or depress a predetermined button 22a to return to the higher hierarchy to perform other processing.

Figure 19:
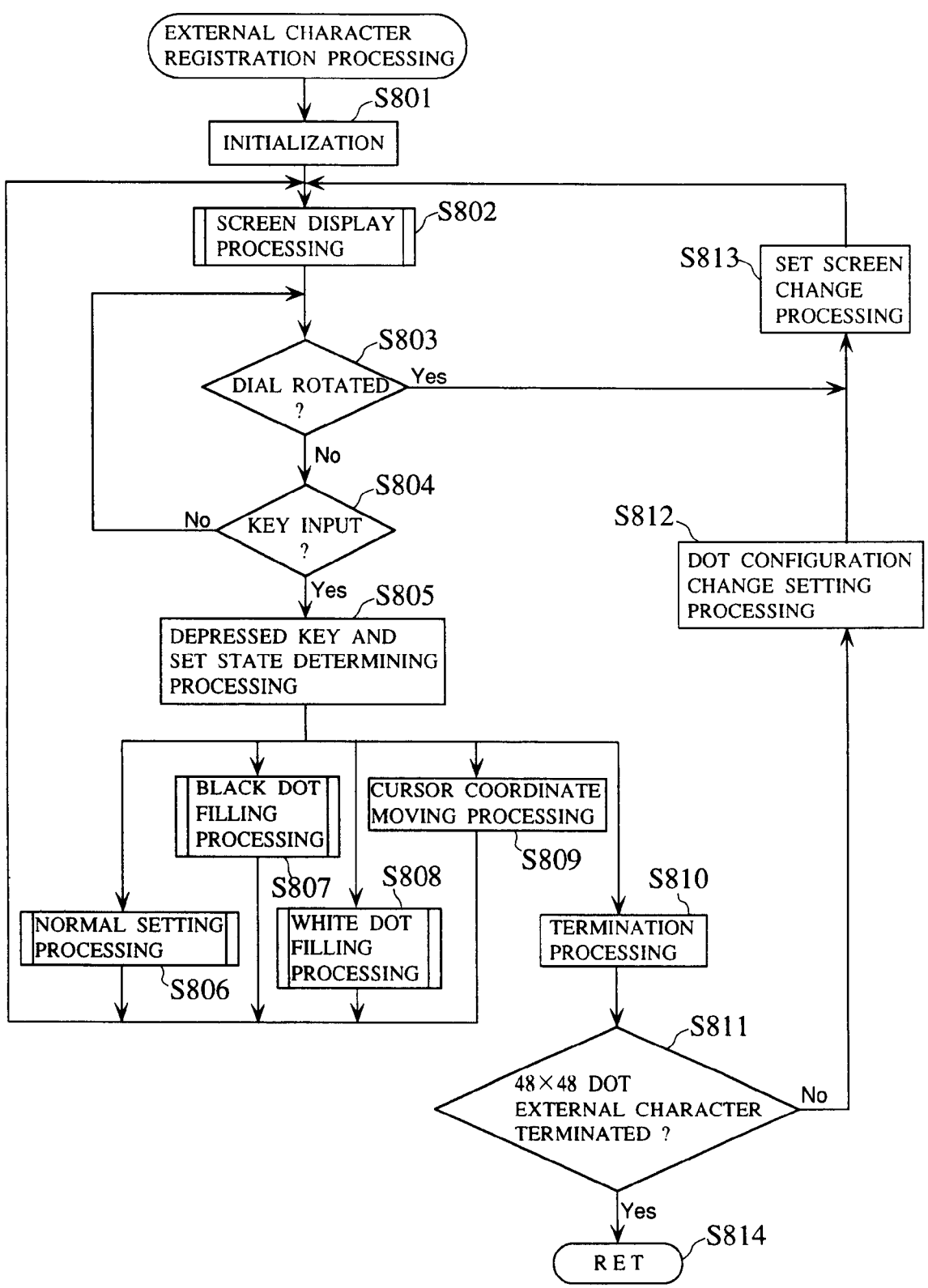
FIG. 19 is a flow chart illustrating a procedure of operations for external character registration processing which serves as the basis of the external character creating method.
Figure 20:
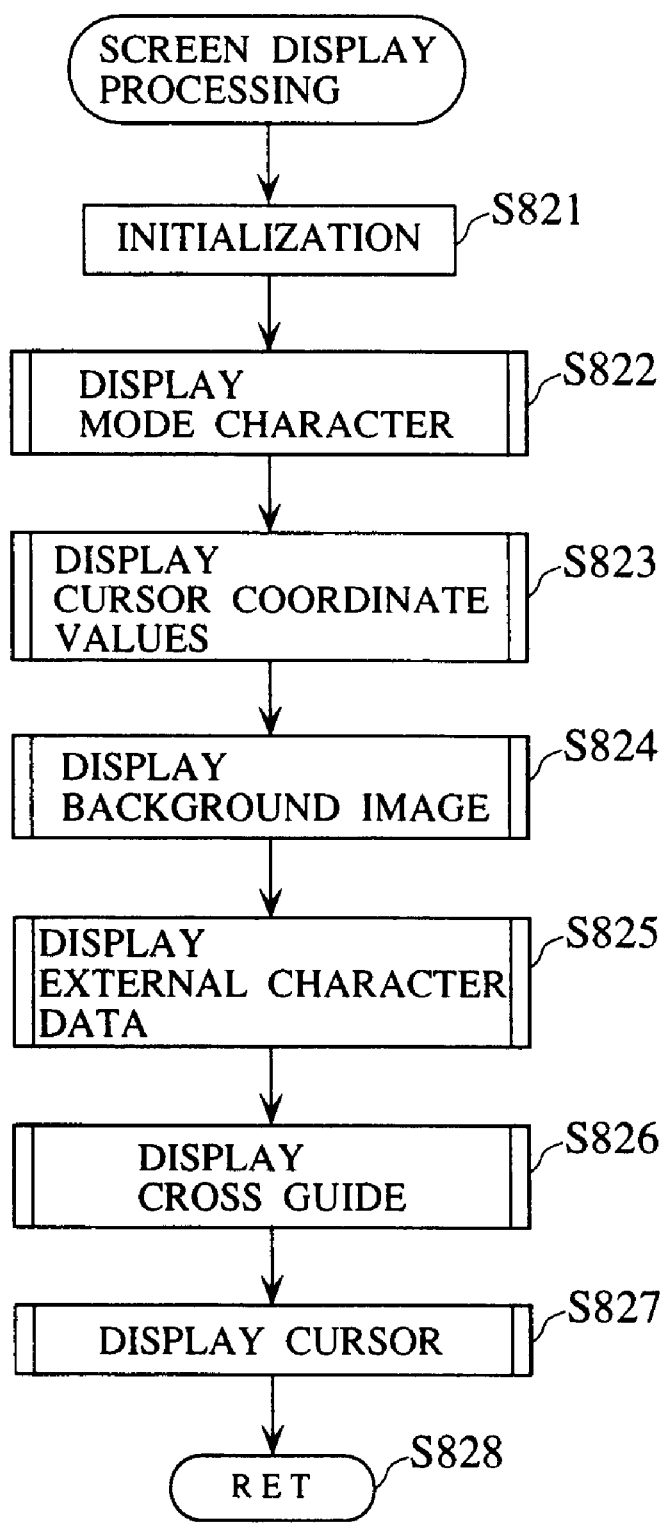
FIG. 20 is a flow chart illustrating a procedure of operations for screen display processing which is one of lower level options of the external character registration processing of FIG. 19.

It should be noted that since the display processing (step S12) in FIG. 17 is also executed in parallel with the character input processing (step S15) as mentioned above, screen display processing (step S802) in FIG. 19 is actually started as a subtask of the display processing (step S12) in FIG. 17, but it is illustrated as one step of the external character registration processing in FIG. 19.

Figure 23A:
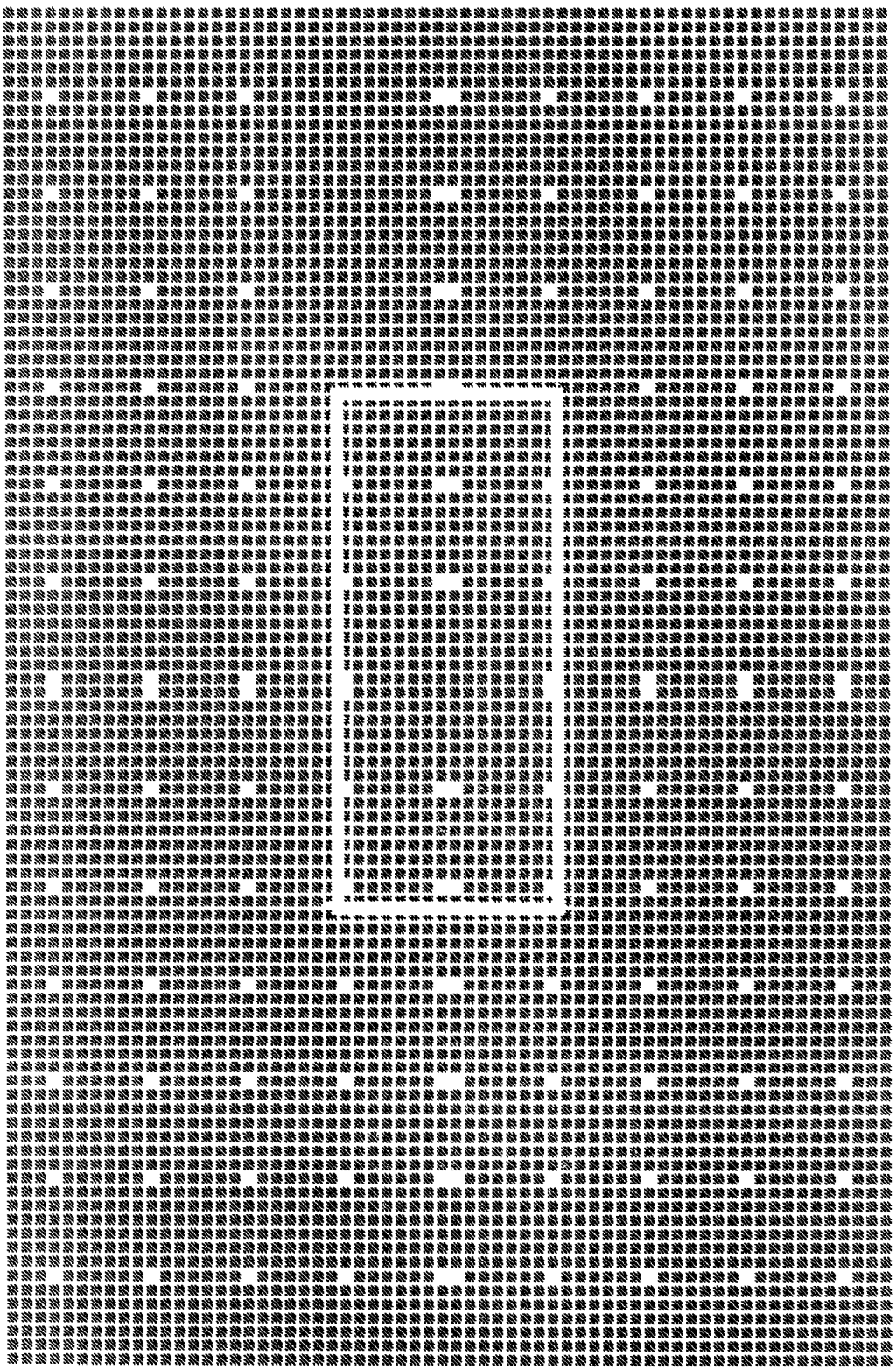
FIGS. 23A and 23B are explanatory diagram for illustrating storing regions for background data and external character data and dimensions thereof.
Figure 23B:
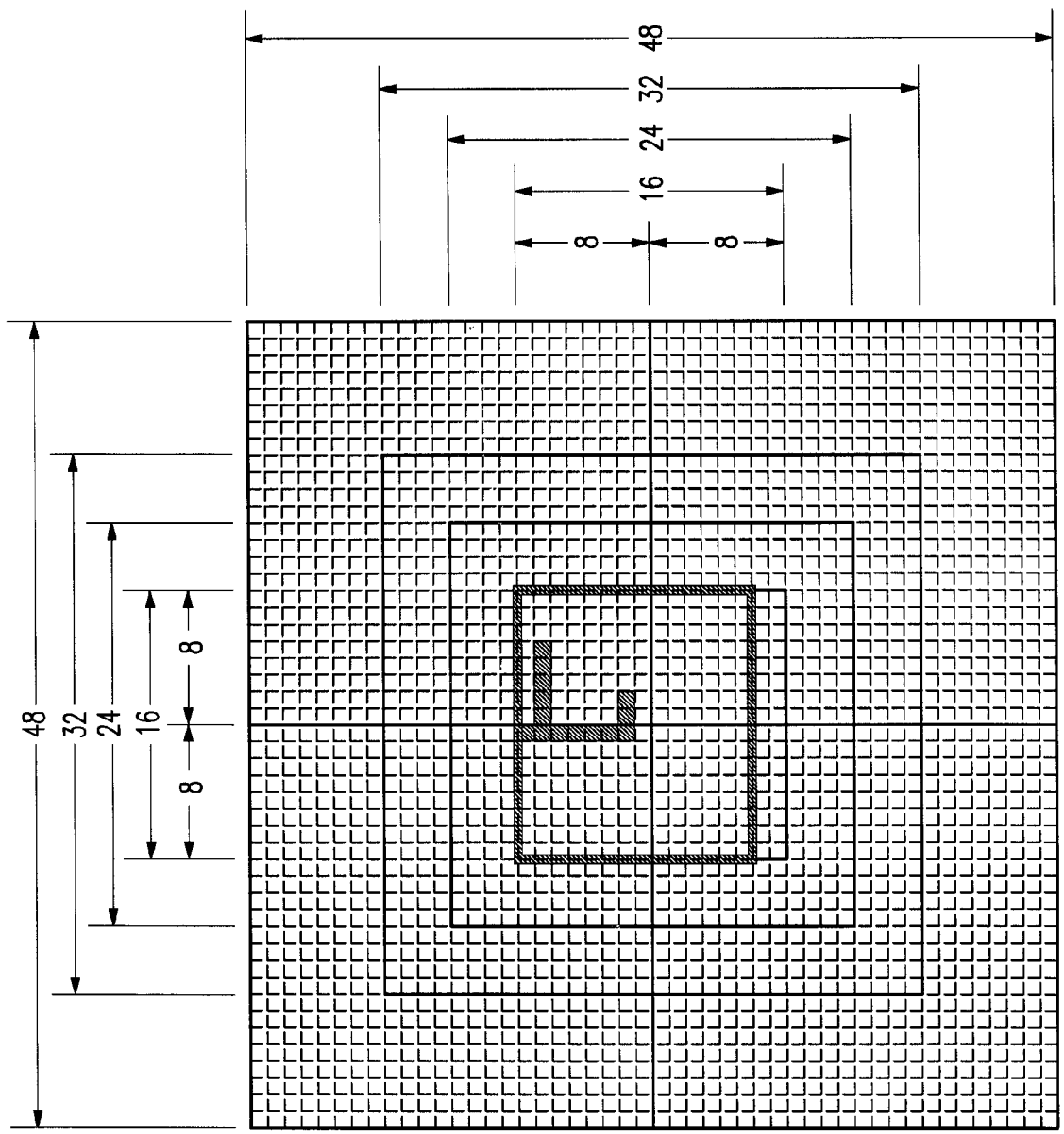

Upon starting the external character registration processing, initialization is first performed (step S801) as illustrated in FIG. 19. In this processing, a drawing mode is set to "NORMAL", later described. An region for storing background data as illustrated in FIG. 23A and a region for storing external character data as illustrated in FIG. 23B are reserved in the RAM 302. An area surrounded by a thick white line frame shown in a central portion of the background data in FIG. 23A corresponds to an area which is first displayed on the display 24 after the initialization.

An area surrounded by a thick black line frame in a central portion of the external character data in FIG. 23B corresponds to an area displayed in the specifying area D on the display 24 in FIG. 22C, later described. In addition, areas surrounded by thin lines relatively represent the dimensions of external character data composed of 24 dots by 24 dots, 32 dots by 32 dots, and 48 dots by 48 dots, in addition to external character data composed of 16 dots by 16 dots. A region for storing each of illustrated external character data of the respective dimensions corresponds to the above-mentioned registration number and is reserved for each of the external character data of the respective dimensions.

After the initialization processing (step S801) is terminated, screen display processing (step S802) is performed, as illustrated in FIG. 19. The screen display processing will be described with reference to FIG. 20.

The initialization is performed for clearing an image so far displayed on the screen (step S821), and then, characters representing a selected mode is displayed (step S822). At this time, since this is immediately after the initialization processing (step S801) in FIG. 19, NORMAL ("普通"), set as a drawing mode, is displayed in a right side area of the screen as the first display on the display 24, as illustrated in FIG. 22A (step S822).

After displaying the characters representing the drawing mode (step S822), coordinate values of a position at which the cursor is located at that time are displayed on the left of the mode characters (step S823). At this time, since the flow is immediately after the initialization processing (step S801) in FIG. 19, "16" is displayed as an initial value of the X-coordinate in the horizontal direction on the upper left of the mode characters "普通" (NORMAL), while "16" is displayed as an initial value of the Y-coordinate in the vertical direction on the lower left of the same, as illustrated in FIG. 22A. The coordinates [16, 16] represent the uppermost right corner of the area of the external character G when the lowermost left corner of the area is designated coordinate values [0, 0] as a reference position. It should be noted that the displayed initial coordinate position is set at the uppermost right corner, i.e., the position represented by the largest coordinate values, because the display screen is too small to additionally display the external character size information thereon, so that the external character size information is given by displaying the largest coordinate values as initial values.

After displaying the cursor coordinate value (step S823), an image represented by the aforementioned background data illustrated in FIG. 23A is displayed as a background image on the left of the cursor coordinate values in the widest possible area up to the left edge of the display 24 (the range of the specifying area D) (step S824), and subsequently an image of external character data G is displayed (step S825). At this time, since the flow is immediately after the initialization processing (S801) in FIG. 19, external character data G, representing a state in which no external character is input, is displayed, as illustrated in FIG. 22A.

Figure 22A:
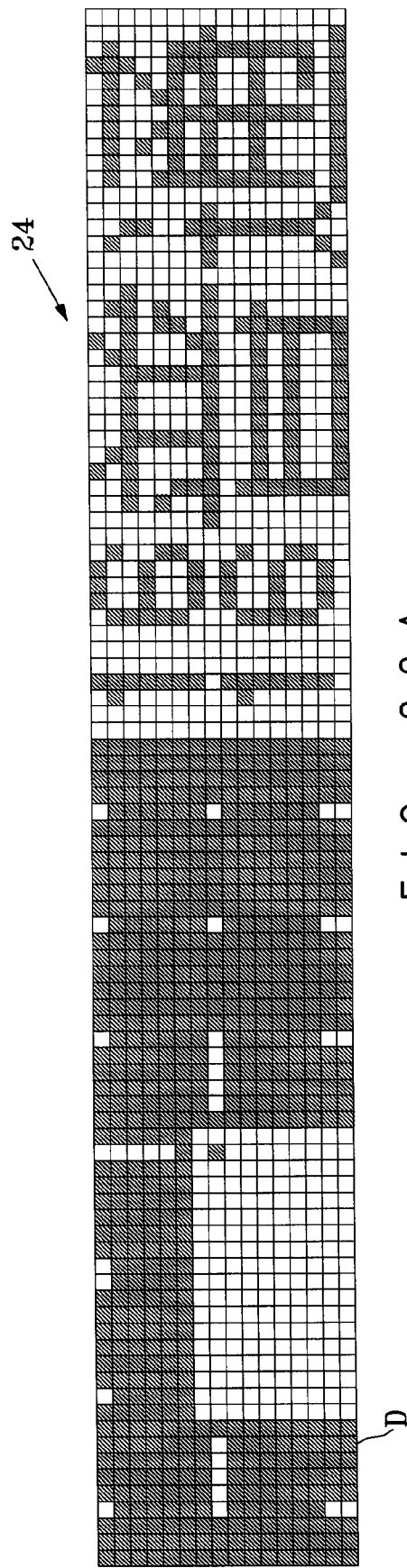
FIGS. 22A to 22D are explanatory diagrams for illustrating an image displayed on the screen in a "NORMA" drawing mode, scrolling of external character, and dot reverse processing.

After displaying the external character data (step S825), a position indicating guide (cross guide) is displayed for indicating the position of the cursor F in the specifying area D (step S826), The cross guide is displayed in white on the background image filled with black dots, as illustrated in FIG. 22A, to indicate the position of the cursor F at the intersection of the crossing lines. In this way, the cursor F can be readily found by referring to the intersection of the cross guide even in a situation in which surrounding external character data prevents the user from viewing the cursor F. Since the cursor F always remains at the same position in the specifying area D, thin lines forming the cross guide may be engraved in the surface of the screen of the display 24 so as to permit the user to readily view a display on the screen. In this case, the cross guide display processing (step S826) is not required.

After displaying the cross guide (step S826), the cursor F is next displayed on the screen (step S827). In the "NORMAL" mode, the display of the cursor F can be switched between white dots and black dots by depressing a predetermined button 22a. Normally, the cursor F is displayed by white dots when it is surrounded by black dots and by black dots when it is surrounded by white dots in order to facilitate the user to find the position of the cursor F.

Figure 22B:
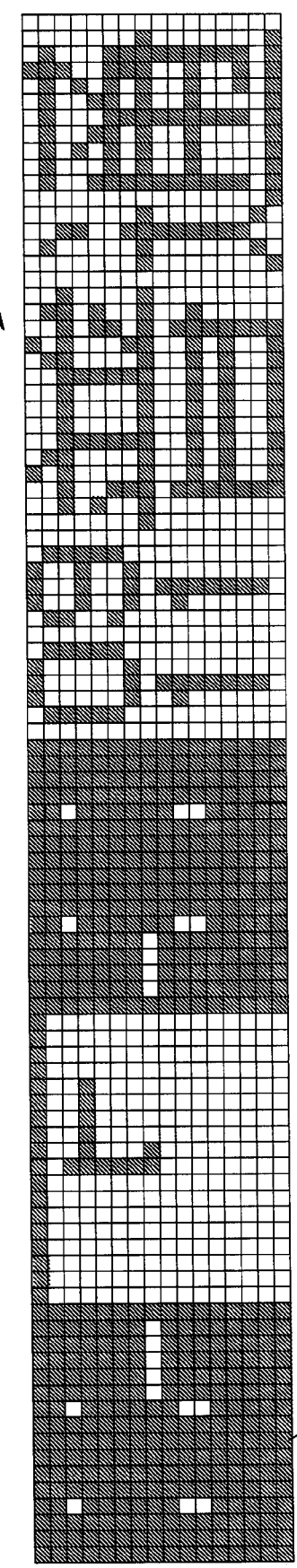

After displaying the cursor F (step S827), the screen display processing (step S802) is terminated (step S828). At this time, since the flow is immediately after the initialization processing (step S801) in FIG. 19, the screen display processing is terminated with the image illustrated in FIG. 22A remaining on the screen of the display 24. The screen display processing (step S802) is executed in respective processing explained below for changing an image so far displayed on the screen each time any key input or the like is detected. FIGS. 22B–22D illustrate images displayed on the screen when the screen display processing (step S802) is executed in other states, later described. In the following, the respective processing will be described with reference to an associated image created at that time, in place of the description on the screen display processing (step S802) started at that time.

Turning back to FIG. 19, after the screen display processing (step S802) is terminated, it is next determined whether or not the operating dial 23 has been rotated (step S803). Since the rotation of the operating dial 23 means a change in the drawing mode, later described, if the operating dial 23 has been rotated (Yes at step S803), set screen changing processing (S813), later described, is executed.

If the operating dial 23 has not been rotated (No at step S803), it is next determined whether or not a key has been input (step S804). If no key has been input (No at step S804), it is determined again whether or not the operating dial 23 has been rotated (step S803). Stated another way, the determination as to whether or not the operating dial 23 has been rotated (step S803) and the determination as to whether or not a key has been input (step S804) are repeated as loop processing until the operating dial 23 is rotated or any key is input. As described above, the input error-determining processing (step S14) is executed in parallel with the character/symbol-input processing at step S15 in FIG. 17, an error is displayed and the flow returns to the loop processing if an operation other than depression of a predetermined key or rotation of the operating dial 23, associated with processing later described, is performed at this time.

When a predetermined key is input (Yes at step S804), the depressed key and a set state is determined (step S805), and following processing is executed in accordance with the determination results. Specifically, normal setting processing (step S806) is next executed when the drawing mode is set to "NORMAL", while black dot filling processing (step S807) is executed when the drawing mode is set to "BLACK" ("黒塗"), and white dot filling processing (step S808) is executed when the drawing mode is set to "WHITE" ("白塗"). Also, when the cursor/conversion key (hereinafter abbreviated as the "cursor key") 32 is depressed, cursor coordinate moving processing (step S809) is executed. Subsequently, the screen display processing (step S802) is executed in accordance with the respective processing results. on the other hand, if the execution key 31 is depressed when "END" is set and displayed, termination processing (step S810) is executed.

As described above, immediately after the initialization processing (step S801), the display 24 initially displays "NORMAL" as the drawing mode, coordinate values [16, 16] as initial values of the [X, Y] coordinates, the background image, and an image represented by the external character data G without input external character, as illustrated in FIG. 22A. FIGS. 22B–22D illustrate images displayed on the screen when an external character E is created by manipulating the predetermined button 22a and the cursor key 32 in the state in which "NORMAL" is displayed on the screen, i.e., in the state in which the normal setting processing (step S806 in FIG. 19) is executed. FIGS. 22B and 22C correspond to the aforementioned FIGS. 18A and 18B, respectively.

In the state illustrated in FIG. 22B in the midway of creating the external character E, the cursor F is located at coordinates [09, 11]. For moving the cursor F at a coordinate position on the right of the present position by manipulating the cursor key 32 in this state, external character data G displayed on the display 24 is actually moved in the opposite direction, i.e., to the left, with the cursor F remaining at the center of the character display region, whereas the coordinates on the external character data G move to the right. Likewise, for moving the cursor F to a coordinate position in the left, upward, or downward direction, the specifying area D is moved in the opposite direction, i.e., in the right, downward, or upward direction, to move the cursor to a target position on the coordinates.

Figure 22C:
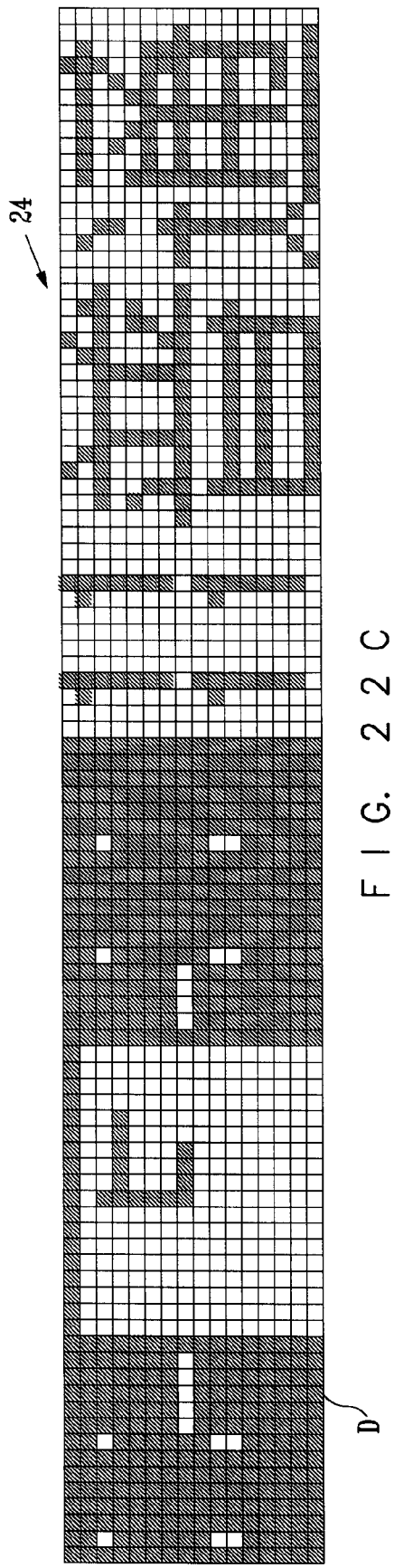
Figure 22D:
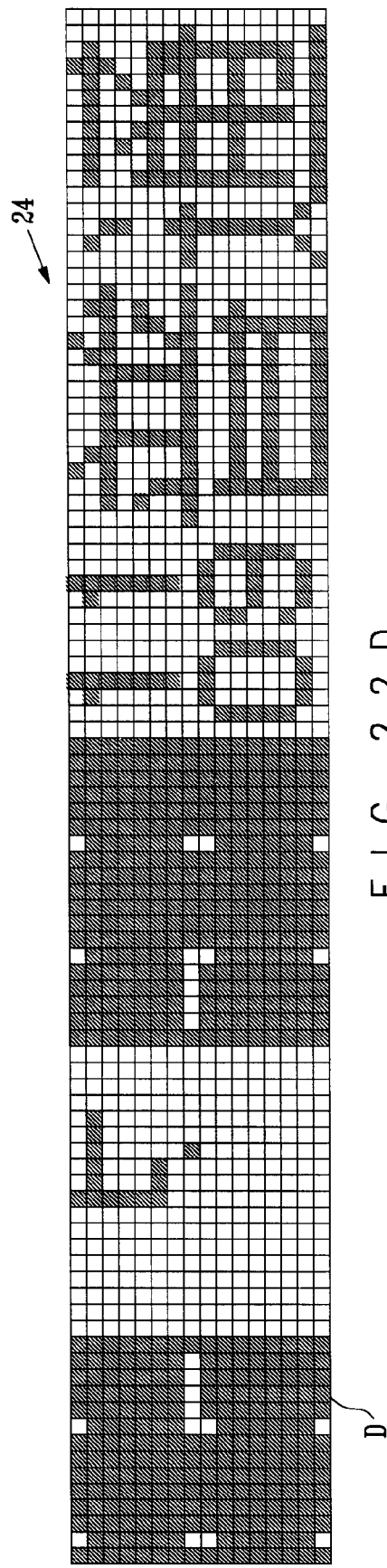

When the predetermined button 22a (hereinafter, the predetermined button 22a is temporarily referred to as the "shift key 22a") is depressed, the cursor key 32 is operated to move the cursor F to coordinates [10, 11], the shift key 22a is again depressed, and the cursor F is moved to coordinates [11, 11] in the state illustrated in FIG. 22B, an image illustrated in FIG. 22C is displayed on the screen. As illustrated, dots at coordinates [09. 11] and [10, 11] can be reversed. In other words, white dots at coordinates [09. 11] and [10, 11] can be reversed to black dots. It should be noted that the reversing processing can be continuously executed by manipulating the cursor key 32 with the shift key 22a left depressed in the state where the cursor F is located at coordinates [09, 11].

The foregoing processing is executed in a loop formed of the screen display processing (step S802), the dial rotation determination (step S803), the key input determination (step S804), the depressed key and set state determining processing (step S805), the normal setting processing (step S806), and the screen display processing (step S802). Stated another way, the above-mentioned dot reversing processing is an example of the processing in a state in which "NORMAL" is selected and set as the drawing mode and the normal setting processing (step S806) in FIG. 19 is executed. A flow of the normal setting processing (step S806) will be next described with reference to FIG. 21.

Figure 21:
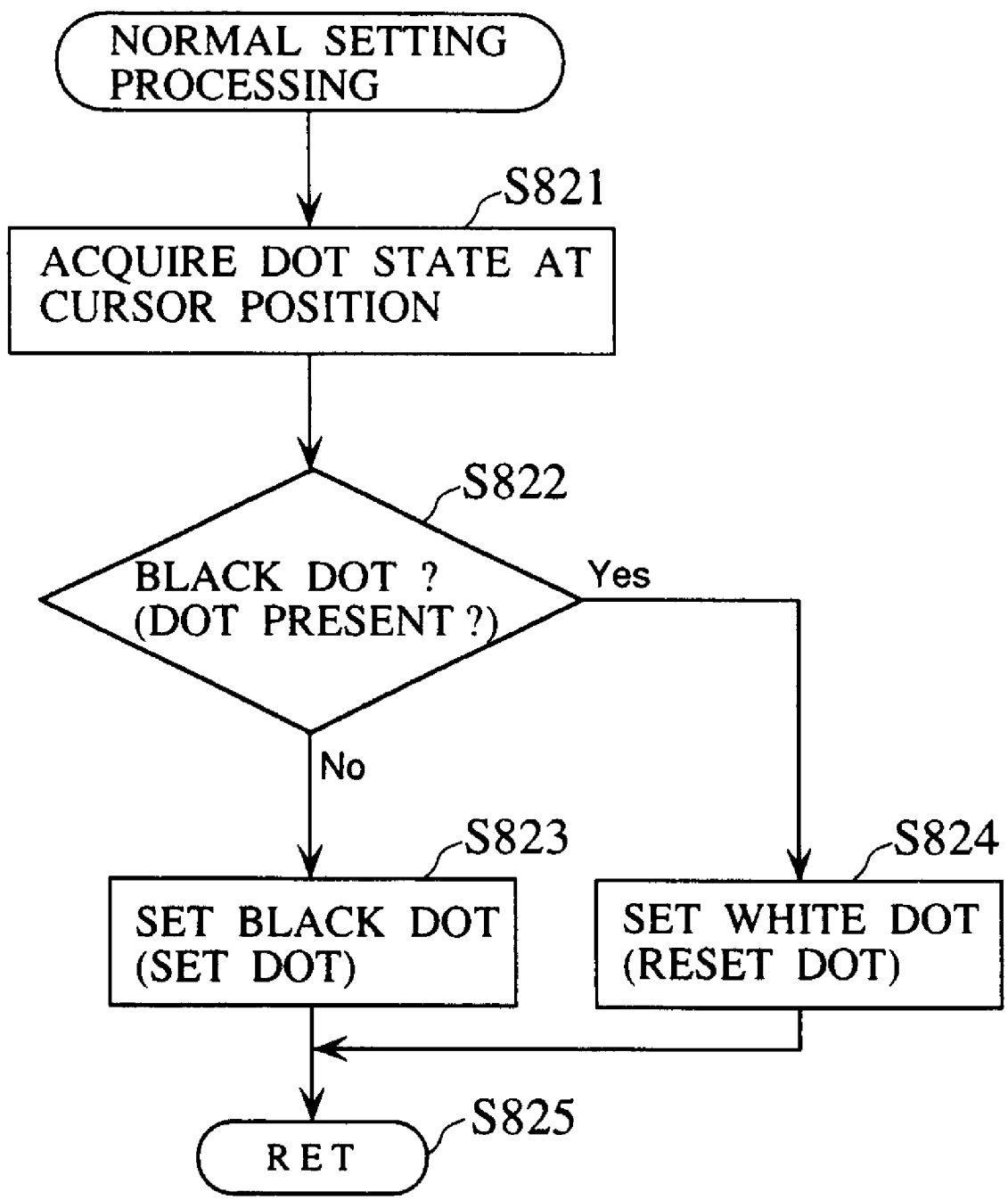
FIG. 21 is a flow chart illustrating a procedure of operations for normal setting processing which is one of lower level options of the external character registration processing of FIG. 19.

As illustrated in FIG. 21, when the shift key 22a is depressed to start the normal setting processing (step S802), a state of a dot at the position of the cursor F at the starting of the normal setting processing, i.e., whether the dot is black or white is acquired (step S821), and it is determined whether or not the dot is black (step S822). If the dot is not black, i.e., it is white (No at step S822), a black dot is set (step S823). Conversely, if the dot is black (Yes at step S822), a white dot is set (step S824), followed by the termination of the processing (step S825). When the processing is executed on the assumption that a black dot is a set dot and a white dot is a reset dot, a dot is set (step S823) if the set dot is not found at the position of the cursor F at that time (No at step S822), while the dot is reset (step S824) if the set dot is found at the position, as indicated in the parenthesis at steps S822, S823, and S824 in FIG. 21, followed by the termination of the processing (step S825).

If the cursor key 32 is manipulated to move the cursor F to coordinates [11, 9] without depressing the shift key 22a in the foregoing state illustrated in FIG. 22C in which the cursor F is located at coordinates [11, 11], an image illustrated in FIG. 22D is displayed on the screen. In this event, dots between the two positions, i.e., between coordinates [11, 11] and coordinates [11, 10] are not reversed, while the cursor F is simply moved. The processing for only moving the position of the cursor F in this way is the aforementioned cursor coordinate moving processing (step S809) in FIG. 19.

Next, set screen changing processing (step S813) to be next executed when the rotation of the operating dial 23 is determined (Yes at step S803) in the aforementioned external character registration processing in FIG. 19 will be described with reference to FIGS. 24A–24D, followed by descriptions on the processing in respective drawing modes after changing, i.e., the black dot filling processing (step S807), the white dot filling processing (step S808), and the termination processing (step S810).

Figure 24A:
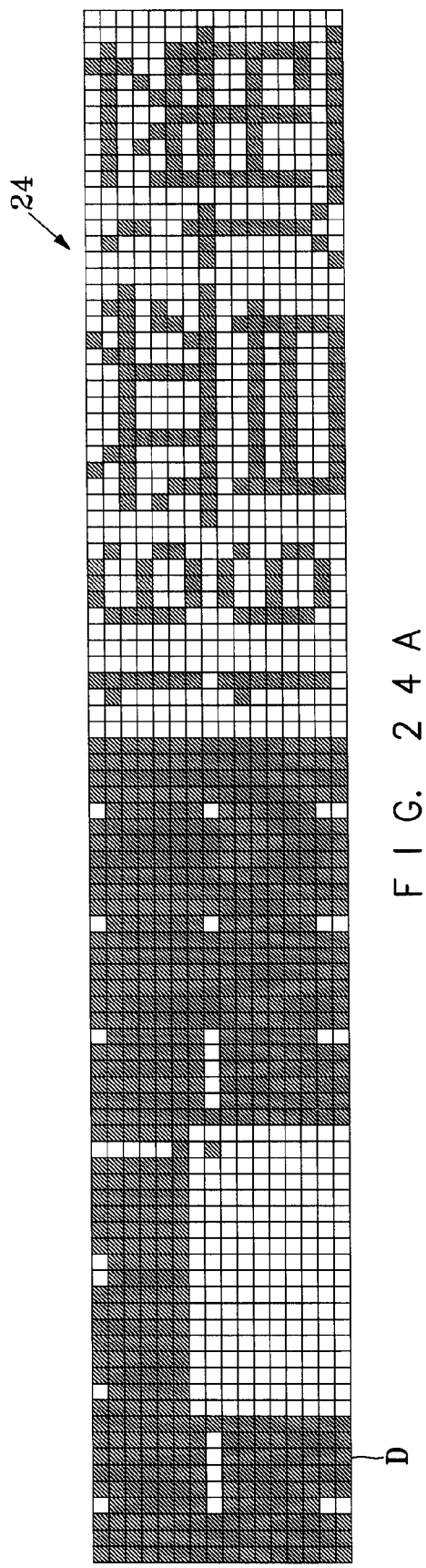

Rotation of the operating dial 23 to the left, when an image illustrated in FIG. 24A (the same as FIG. 22A) is displayed on the screen, causes the indication of the drawing mode, currently "NORMAL", to sequentially change as "普通"(NORMAL)→"黒塗" (BLACK) →"白塗"(WHITE)→"終り??"(END ?)→"普通"(NORMAL) When the operating dial 23 is rotated in the opposite direction, the drawing mode changes in the reverse order, i.e., "普通"(NORMAL)→"終り??"(END ?) →"白塗"(WHITE)→"黒塗"(BLACK)→"普通"(NORMAL). The foregoing processing is executed in a loop formed of the screen display processing (step S802), the dial rotation determination (step S803), the set screen changing processing (step S813), and the screen display processing (step S802).

Figure 24B:
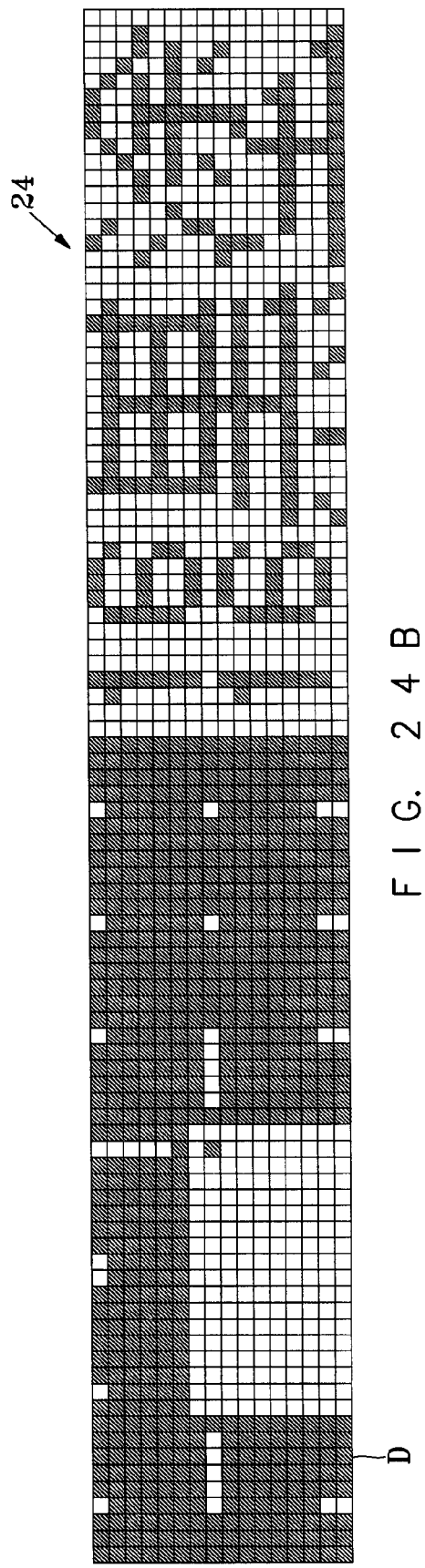

If the cursor F is moved to an arbitrary start position and the shift key 22a or the execution key 31 is depressed in a display state illustrated in FIG. 24B, i.e., in a state in which "BLACK" is selected and set as the drawing mode to execute the black dot filling processing (step S807) in FIG. 19, a black dot is set as a dot at the start position. When the cursor is subsequently moved to an arbitrary position, a rectangle filled with black dots, defined by a line connecting the moving cursor F and the start position as a diagonal, is displayed on the screen. This rectangle is expanded and contracted in association with the movement of the cursor F. If the cursor F is moved to an arbitrary end point in this state and the shift key 22a or the execution key 31 is depressed, the dots filling the black rectangle are all set to black dots.

When a single dot is to be set to a black dot in the drawing mode remaining in "BLACK", the dot may be specified twice as an initial point and as an end point. Stated another way, the "BLACK" mode may be utilized as a drawing mode for specifying a black dot at a particular position. The "BLACK" mode may be further utilized as a drawing mode for specifying a black line by specifying two dots which have different coordinate values only in the vertical or horizontal coordinate to collectively set a group of dots on a vertical line or on a horizontal line to black dots.

The foregoing processing is executed in a loop formed of the screen display processing (step S802), the dial rotation determination (step S803), the key input determination (step S804), the depressed key and set state determining processing (step S805), the black dot filling processing (step S807), and the screen display processing (step S802) in FIG. 19.

If the cursor F is moved to an arbitrary initial position and the shift key 22a or the execution key 31 is depressed in a display state illustrated in FIG. 24C, i.e., in a state in which "WHITE" is set as the drawing mode to execute the white dot filling processing (step S808), a white dot is set at the initial position. Similarly to the case of the "BLACK" mode, when the cursor F is subsequently moved to an arbitrary position, a rectangle filled with white dots, which expands and contracts in association with the movement of the cursor F, is displayed in the specifying area D. When the shift key 22a or the execution key 31 is depressed with the cursor F being at an arbitrary end position, the dots filling the white rectangle are all set to white dots. It will be understood that the "WHITE" drawing mode may also utilized as a drawing mode for specifying a single white dot or a white line, as is the case of the "BLACK" mode.

The foregoing processing is executed in a loop formed of the screen display processing (S802), the dial rotation determination (S803), the key input determination (S804), the depressed key and set state determining processing (step S805), the white dot filling processing (step S808), and the screen display processing (step S802) in FIG. 19.

If the execution key 31 is depressed in a display state illustrated in FIG. 24D, i.e., in a state in which "END ?" is set as the drawing mode to execute the termination processing (step S810 in FIG. 19), external character data G at the time the execution key 31 is depressed is stored in the aforementioned storing region for external character data corresponding to its registration number and size. As has been so far described, an external character composed of 16 dots by 16 dots has been created in this example, so that the external character data G is stored in a storing region for 16×16 dot external character data.

After the termination processing (step S810) has been terminated, it is next determined whether or not the creation of 48×48 dot external character data has been terminated (step S811). At this time, since the 16×16 dot external character data only has been created (No at step S811), dot configuration change setting processing (step S812), corresponding to 24×24 dot external character data, is executed. Subsequently, an external character is created for 24×24 dot external character data G, as is the case of the creation of 16-dot external character.

Next, the dot configuration change setting processing (step S812) will be described in detail with reference to FIGS. 23B and 25A–25D.

As described above, the external character storing region for external character data of the respective dimensions is reserved in correspondence to the aforementioned registration number and for each of the respective external character data of the respective dimensions. Thus, when a 16×16 dot external character has been created, the associated external character data G is stored in a storing region for the external character data having a dimension of 16 dots by 16 dots within the external character data storing regions corresponding to a specified registration number, illustrated in FIG. 23B, thus completing the registration of the 16×16 dot external character corresponding to the specified registration number.

When the registration of the 16-dot external character is terminated, the control block 300 of the stamp-making apparatus 1 generates 24×24 dot external character data G having the vertical and horizontal dimensions both 1.5 times larger than those of the 16×16 dot external character data G and 32×32 dot external character data G similarly having both the dimensions twice larger, and stores the generated external character data in corresponding external character data storing regions. After the processing for generating the external character data G and the storage of the generated external character data G have been completed, "NORMAL" is set as an initial drawing mode.

The processing so far described is the aforementioned dot configuration change setting processing (step S812) appearing in FIG. 19. Subsequently, the size of external character data to be displayed and processed is changed to 24×24 dots (step S813), and the screen display processing (step S802) is executed, followed by the creation of an external character for 24×24 dot external character data G. The generation of enlarged external character data G is also performed when the creation of a 24×24 dot external character is completed. In this event, 48×48 dot external character data G. having twice larger vertical and horizontal dimensions, is generated from the 24×24 dot external character data G and stored in a corresponding storing region.

Figure 25A:
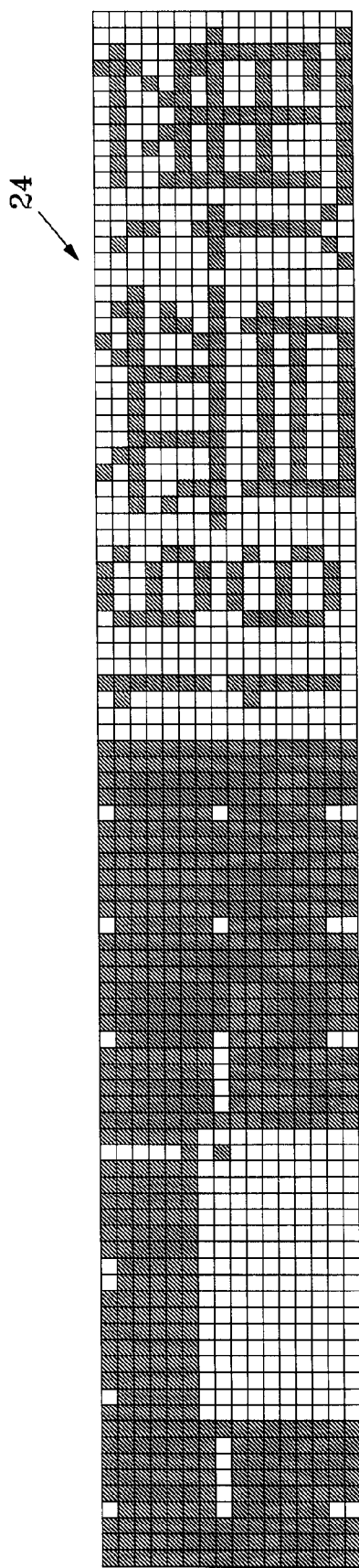
FIGS. 25A to 25D are explanatory diagrams for illustrating images displayed on the screen when the size of external character data is changed.
Figure 25B:
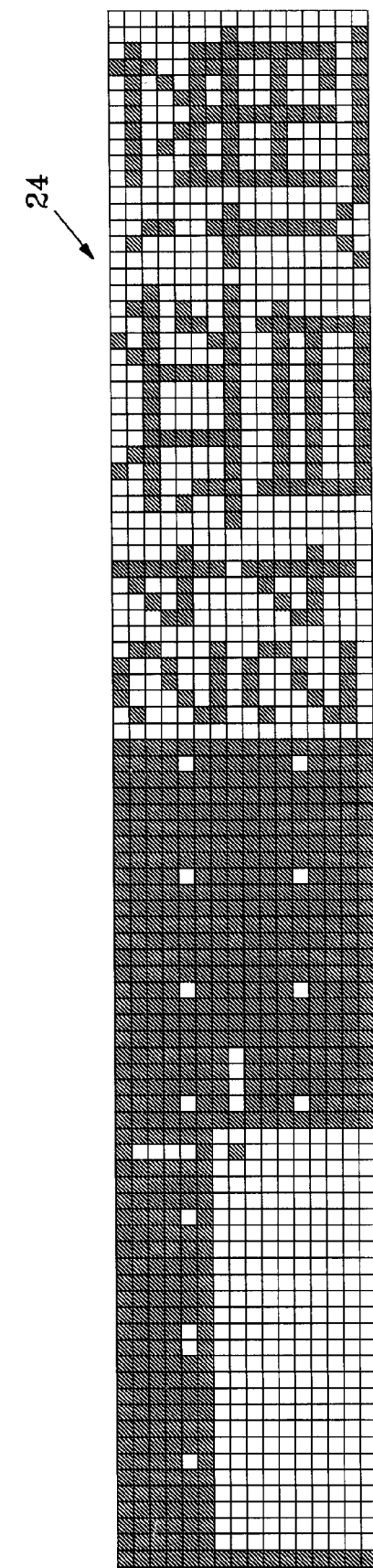

FIG. 25A illustrates an image displayed on the screen of the display 24 in an initial state of the 16×16 dot external character creation, and FIG. 25B illustrates an image displayed on the screen in an initial state of 24×24 dot external character creation. It can be seen that FIG. 25A is the same as FIGS. 22A and 24A. As illustrated in FIG. 25B, maximum coordinate values, i.e., coordinates [24, 24] are displayed as initial coordinate values, also when a 24×24 dot external character is to be created, to display dot size information. In this case, the 24×24 dot external character data G has both vertical and horizontal dimensions 1.5 times larger than those of the 16×16 dot external data.

It should be noted that while FIGS. 25A–25D illustrate the screens on which initial external character data G having no external character input therein is displayed for demonstrating the difference in size between the respective external character data, actually, external data G having vertical and horizontal dimensions 1.5 times larger than an external character created by 16×16 dot external data is displayed on the screen when a 24×24 dot external character is created.

Generally, when a smaller image is created and enlarged, roughness in the image becomes conspicuous in the enlarged image. Particularly, such roughness is prominent in a curve or the like which is falsely drawn by a plurality of dots aligned in tiers. To avoid this inconvenience, the stamp-making apparatus 1 can modify external character data G enlarged from a 16×16 dot character, for example, on the screen for displaying a 24×24 dot character to provide a more attractive image or a more attractive external character which has a fineness appropriate to the larger number of dots, i.e., resolution.

Figure 25C:
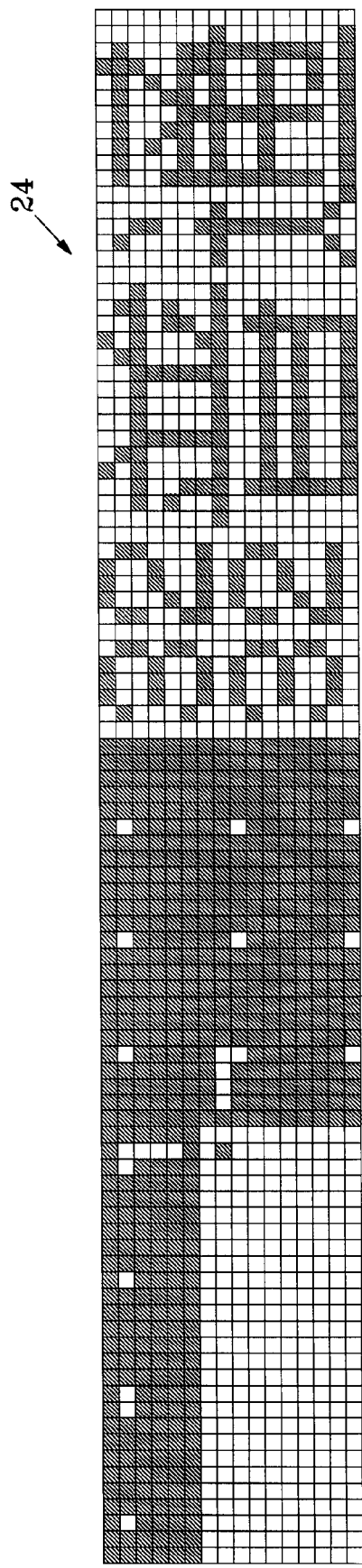
Figure 25D:
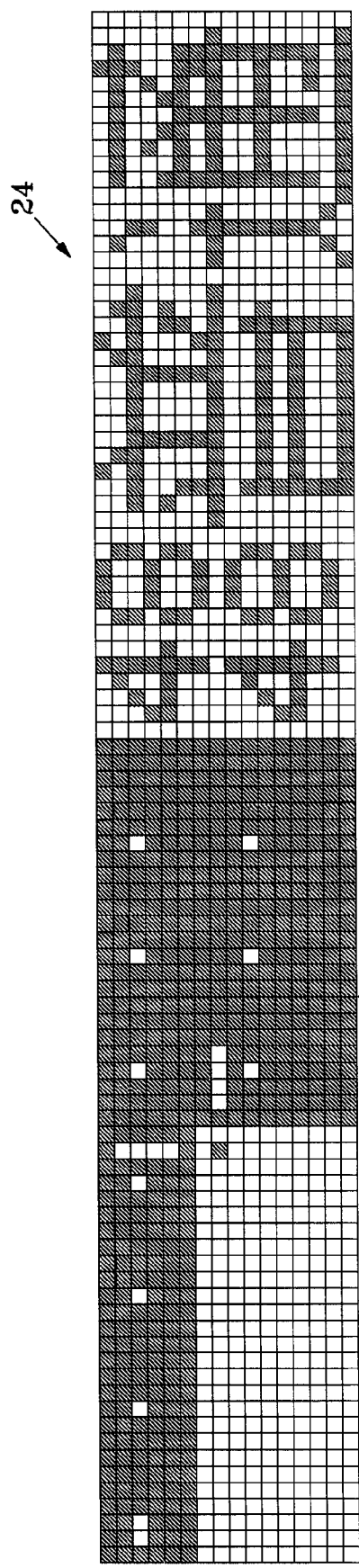

In addition, the stamp-making apparatus 1 also permits a similar modification to be made on a further enlarged image (external character). Specifically, in the dot configuration change setting processing (step S812) and the set screen changing processing (step S813), after completing the creation of a 24×24 dot external character, the aforementioned 32×32 dot external character data G having the vertical and horizontal dimensions twice larger than 16×16 dot external character data G is displayed in the specifying area D, as illustrated in FIG. 25C, so that the displayed external character can be subsequently modified to have a fineness appropriate to a 32×32 dot external character. Similarly, after completing the creation of a 32×32 external character, the aforementioned 48×48 dot external character data G, having the vertical and horizontal dimensions twice larger than 24×24 dot external character data G, can be modified on the screen for displaying a 48×48 dot character illustrated in FIG. 25D to have a fineness appropriate to a 48×48 dot character.

When the aforementioned termination processing (step S810) in FIG. 19 is terminated after the creation of the 48×48 external character has been completed, it is next determined whether or not the creation of a 48×48 dot external character has been terminated (step S811). At this time, since the creation of the 48×48 dot external character has been terminated (Yes at step S811), the external character registration processing (step S80) is completely terminated (step S814).

As previously mentioned, the stamp-making apparatus 1 has "Modification", "Call", "Copy", "Delete", and so on, other than the above-described "Registration", as lower level options of "External Character". These lower level options will be described below.

First, when "Modification" is selected, the external character management mode enters "Modification of External Character" to display registration numbers on the screen as still lower level options of "Modification". In this event, unlike "Registration", displayed on the screen are registered registration numbers associated with registered external characters. Thus, when any of the displayed registration numbers is selected and the execution key 31 is depressed, external character modification processing is started as a subtask of the character/symbol-input processing (step S15). If "Modify External Character" is selected when no external character has been registered, i.e., when no registration number can be displayed, the input error-determining processing (step S14), executed in parallel, displays an input error.

In the external character modification processing, an image displayed in the screen display processing (step S802) immediately after the initialization processing (step S801) of the external character registration processing described above in connection with FIG. 19 is the image of registered external character data associated with a specified one of registration numbers. Also, While 24×24 dot and 32×32 dot external character data G are generated from 16×16 dot external character data in the aforementioned external character registration processing, 16×16 dot, 24×24 dot, 32×32 dot, and 48×48 dot external character data G are independent of each other in the external character modification processing. Thus, a modification on an external character of a certain dot configuration would not affect the same external character of other dot configurations. The external character modification processing except for the foregoing is performed in a manner similar to the external character registration processing, and modified external character data G is written over a storing region for external character data having a specified registration number and stored in the storing region.

When "Call" is selected, registration numbers are similarly displayed as still lower level options thereof. In this event, registered registration numbers associated with registered external characters are displayed as is the case of selecting "Modification". When any of the displayed registration numbers is selected and the execution key 31 is depressed, an external character associated with the specified registration number is called as text data. Stated another way, by selecting "Call External Character", an external character can be utilized as a stamp image, just in the same manner as hiragana, symbol, or the like which is input as text data for a stamp image. Also, if "Call" is selected when there is no registered registration number, an input error is displayed by the parallelly executed input error-determining processing (step S14) as is the case of "Modification".

When "Copy" is selected, registration numbers are similarly displayed as still lower level options. In this event, registered registration numbers associated with registered external characters are first displayed, as is the case of "Modification". When any of the displayed registration numbers is selected and the execution key 31 is depressed, unregistered registration numbers are displayed as is the case of "Registration". When any of the unregistered registration numbers is further selected and the execution key 31 is depressed, registered external character data associated with the specified registration number is copied to a storing region for external character data of the specified unregistered registration number. Thus, "Copy" may be utilized to copy an external character in a storing region with another registration number, for example, in order to modify a portion of the external character by "Modification" to create a different external character. In this way, "Copy" has a wide applicable area and further facilitates the creation of external characters. In this event, if there is no registered registration number, or if there is no unregistered registration number, an input error is displayed by the parallelly executed input error-determining processing (step S14).

When "Delete" is selected, registered registration numbers are similarly displayed as lower level options thereof. Selection of any of the displayed numbers followed by depression of the execution key 31 results in deleting the external character data associated with the specified registration number. Stated another way, "Delete" is utilized to delete unnecessary external characters to increase unregistered registration numbers, such that a larger number of newly required external characters can be registered in the stamp-making apparatus 1. Also, in "Delete", an input error is displayed by the parallelly executed input error-determining processing (step S14) if there is no registered registration number.

In the stamp-making apparatus 1 of the present invention as described above, since external character data G is vertically or horizontally scrolled within the specifying area D on the display 24 to create an external character without moving the position of the cursor F, the position of the cursor F will not be missed, and an external character can be created in a clearly visible state. In addition, since the position of the cursor F is indicated by the intersection of the cross in the cross guide (position indicating guide), the user can readily find the position of the cursor F even in a situation in which surrounding external character data prevents the user from viewing the cursor F.

Further, since the drawing mode can be selected from the three options: "NORMAL", "BLACK", and "WHITE" arbitrarily in accordance with a feature of a particular external character to be created, the creation of an external character is facilitated. For example, when "NORMAL" (dot reverse drawing mode) is selected, arbitrary dots can be specified one by one, and each dot can be reversed, i.e., a black dot can be reversed to a white dot, and vice versa. When "BLACK" or "WHITE" (area specifying drawing mode) is selected, two dots on the specifying area may be specified to define an arbitrary rectangular range to collectively set black dots or white dots (the same dot information) in the specified range.

Furthermore, since the external character management mode advantageously has a plurality of options: "Registration", "Modification", "Call", "Copy", "Delete", and so on, one of them may be arbitrarily selected as required to manage external character data as well as to more readily and efficiently create external characters. For example, with "Modification" (external character modification mode) selected, a registered external character may be modified to be used as another external character, as described above. Also, selection of "Call" (external character call mode) permits the user to generate corresponding text data from registered external character data, so that the user can create text data of arbitrary symbol, figure, and so on, thus making it possible to provide a variety of text data.

With "Copy" (external character copy mode) selected, when registered external character data is copied such that the copied external character data is utilized in other processing, the original external character data can be preserved in an original state even when the external character data is subjected to modification or the like. In this event, if the external character modification mode is utilized together, original external character data and modified external character data can be simultaneously registered, thus increasing variations of external characters.

With "Delete" (external character deletion mode) selected, unnecessary external character data can be deleted from registered external character data, so that a storing region can be saved in the RAM 302 (memory or the like) used for registering external character data therein.

It should be noted that while the foregoing embodiment has been described in connection with the stamp-making apparatus having a small display, the present invention may also be applied to a multi-window environment in a personal computer, a work station, or the like which can open a number of windows on a single display screen, wherein an external character such as a convenient-sized figure or the like is created in a window (specifying area) of a size substantially equal to that of a so-called icon in a rather small area on the display screen on which a number of windows are open for other operations.

While the present invention has been specifically described with reference to a preferred embodiment thereof, it will be understood by those skilled in the art that a variety of modifications may be made without departing from the spirit and scope of the present invention.

What is claimed is:

1. In a method of creating an external character for an image forming apparatus having a display screen, the display screen extending over an area having a vertical direction and a horizontal direction, said method comprising the steps of displaying at least a portion of image data in a specifying area on said display screen, said image data being displayed in the form of at least one dot determined by associated dot information in said image data, displaying a dot-shaped cursor in said specifying area of said display screen, and creating an external character on said displayed image data using said cursor, the improvement wherein said step of creating an external character comprises:

scrolling said image data in the vertical direction and in the horizontal direction to create an external character with said cursor being fixed at a position in said specifying area;

and which method further comprises:

providing a visible position indicating guide having portions that lie on a plurality of lines which intersect at the position of said cursor; and a plurality of external character management modes, each of which is individually selectable to manage said image data, said plurality of external character management modes including an external character registration mode for creating said external character on said image data and registering said external character.

2. An external character creating method according to claim 1, wherein said position indicating guide is displayed within said display screen.

3. An external character creating method according to claim 1, wherein said position indicating guide portions are formed on said image forming apparatus outside said display screen.

4. An external character creating method according to claim 1, wherein said method includes a plurality of drawing modes for executing a plurality of drawing methods using said cursor.

5. An external character creating method according to claim 4, wherein said plurality of drawing modes include a dot reverse drawing mode for reversing dot information of a dot in said image data corresponding to the position of said cursor.

6. An external character creating method according to claim 4, wherein said plurality of drawing modes includes a range specifying drawing mode for specifying two dots on said image data with said cursor to set the same dot information to a group of dots within a rectangular area defined by a line connecting the two dots as a diagonal.

7. An external character creating method according to claim 1, wherein said external character management modes further include at least one of:

an external character modification mode for modifying an external character associated with a registered image data to re-register the modified external character;

an external character call mode for calling registered image data to generate corresponding text data;

an external character copy mode for copying registered image data to separately register the copied image data as different image data; and an external character deletion mode for deleting registered image data.

8. An external character creating method according to claim 1, wherein said position at which said cursor is being fixed in said specifying area is a home position to create said external character.

9. In a method of creating an external character for image forming apparatus having a display screen, the display screen extending over an area having a vertical direction and a horizontal direction, said method comprising the steps of displaying at least a portion of image data in a specifying area on said display screen, said image data being displayed in the form of at least one dot determined by associated dot information in said image data, displaying a dot-shaped cursor in said specifying area of said display screen, and creating an external character on said displayed image data using said cursor, the improvement wherein said step of creating an external character comprises:

scrolling said image data in the vertical direction and in the horizontal direction to create an external character with said cursor being fixed at a position in said specifying area;

and wherein said method includes:

a plurality of drawing modes for executing a plurality of drawing methods using said cursor; and a plurality of external character management modes, each of which is individually selectable to manage said image data, said plurality of external character management modes including an external character registration mode for creating said external character on said image data and registering said external character.

10. An external character creating method according to claim 9, wherein said plurality of drawing modes include a dot reverse drawing mode for reversing dot information of a dot in said image data corresponding to the position of said cursor.

11. An external character creating method according to claim 9, wherein said plurality of drawing modes include a range specifying drawing mode for specifying two dots on said image data with said cursor to set the same dot information to a group of dots within a rectangular area defined by a line connecting the two dots as a diagonal.

12. An external character creating method according to claim 9, wherein said external character management modes further include at least one of:

an external character modification mode for modifying an external character associated with a registered image data to re-register the modified external character;

an external character call mode for calling registered image data to generate corresponding text data;

an external character copy mode for copying registered image data to separately register the copied image data as different image data; and an external character deletion mode for deleting registered image data.

13. In a method for creating an external character for an image forming apparatus having a display screen, the display screen extending over an area having a vertical direction and a horizontal direction, said method comprising the steps of displaying at least a portion of image data in a specifying area on said display screen, said image data being displayed in the form of at least one dot determined by associated dot information in said image data, displaying a dot-shaped cursor in said specifying area of said display screen, and creating an external character on said displayed image data using said cursor, the improvement wherein said step of creating an external character comprises:

scrolling said image data in the vertical direction and in the horizontal direction to create an external character with said cursor being fixed at a position in said specifying area; and wherein said method includes:

a plurality of external character management modes, each of which is individually selectable to manage said image data, said plurality of external character management modes including an external character registration mode for creating said external character on said image data and registering said external character.

14. An external character creating method according to claim 13, wherein said external character management modes further include at least one of:

an external character modification mode for modifying an external character associated with a registered image data to re-register the modified external character;

an external character call mode for calling registered image data to generate corresponding text data;

an external character copy mode for copying registered image data to separately register the copied image data as different image data; and an external character deletion mode for deleting registered image data.

* * * * *

UNITED STATES PATENT AND TRADEMARK OFFICE
CERTIFICATE OF CORRECTION

PATENT NO.      : 6,421,032 B2
DATED           : July 16, 2002
INVENTOR(S)     : Hayama et al.

It is certified that error appears in the above-identified patent and that said Letters Patent is hereby corrected as shown below:

<u>Title page,</u>
Item [30], change "6-341999" to -- 7-341999 --; and change "7-291142" to -- 8-291142 --.

Signed and Sealed this

Eleventh Day of February, 2003

JAMES E. ROGAN
*Director of the United States Patent and Trademark Office*